(12) United States Patent
Wei et al.

(10) Patent No.: US 10,575,308 B2
(45) Date of Patent: Feb. 25, 2020

(54) RESOURCE ALLOCATION METHOD, BASE STATION, AND USER EQUIPMENT

(71) Applicant: Huawei Technologies Co., Ltd., Shenzhen (CN)

(72) Inventors: Dongdong Wei, Shanghai (CN); Yi Zhang, Shanghai (CN); Hao Tang, Shanghai (CN); Zhenfei Tang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 89 days.

(21) Appl. No.: 15/656,342

(22) Filed: Jul. 21, 2017

(65) Prior Publication Data

US 2017/0325213 A1    Nov. 9, 2017

Related U.S. Application Data

(63) Continuation of application No. PCT/CN2015/071242, filed on Jan. 21, 2015.

(51) Int. Cl.
*H04W 72/04* (2009.01)
*H04L 1/00* (2006.01)

(52) U.S. Cl.
CPC ......... *H04W 72/048* (2013.01); *H04L 1/0014* (2013.01); *H04W 72/042* (2013.01)

(58) Field of Classification Search
CPC ... H04L 1/0014; H04L 5/0007; H04L 5/0039; H04L 5/0044; H04L 5/0094; H04W 72/04; H04W 72/042; H04W 72/048
See application file for complete search history.

(56) References Cited

U.S. PATENT DOCUMENTS

2008/0084815 A1    4/2008  Shin
2010/0232524 A1*   9/2010  Chen .................. H04W 36/385
                                                         375/259

(Continued)

FOREIGN PATENT DOCUMENTS

CN    101374017 A    2/2009
CN    102238732 A    11/2011

(Continued)

OTHER PUBLICATIONS

Machine Translation and Abstract of Chinese Publication No. CN101374017, Feb. 25, 2009, 8 pages.
"3rd Generation Partnership Project; Technical Specification Group Radio Access Network; Evolved Universal Terrestrial Radio Access (E-UTRA); Physical layer procedures (Release 12)," 3GPP TS 36.213, V12.4.0, Technical Specification, Dec. 2014, 225 pages.

(Continued)

*Primary Examiner* — Awet Haile
(74) *Attorney, Agent, or Firm* — Conley Rose, P.C.

(57) ABSTRACT

A resource allocation method to resolve a problem that a transport block of a typical enhanced voice service (EVS) scenario in an air interface is much smaller than a transport block of a conventional adaptive multi rate (AMR), and use of a resource allocation method in the existing long term evolution (LTE) causes a waste of user spectrum resources such that spectrum utilization in an EVS scenario can be improved. The method includes determining resource allocation information and resource allocation block indication information, where the resource allocation information includes information indicating at least one fractional resource block (FRB) allocated to user equipment, and the resource allocation block indication information indicates that a resource allocation block is the FRB, where a resource occupied by the FRB is less than one RB, and notifying the user equipment of the resource allocation information and the resource allocation block indication information.

17 Claims, 3 Drawing Sheets

(56) References Cited

U.S. PATENT DOCUMENTS

| | | | |
|---|---|---|---|
| 2012/0087331 A1 | 4/2012 | Seo et al. | |
| 2012/0287885 A1* | 11/2012 | Dai | H04W 72/044 370/329 |
| 2013/0176952 A1 | 7/2013 | Shin et al. | |
| 2014/0140298 A1* | 5/2014 | Han | H04L 5/0023 370/329 |
| 2016/0119384 A1* | 4/2016 | Karimli | H04L 65/1069 370/252 |
| 2017/0164350 A1* | 6/2017 | Sun | H04L 5/0007 |

FOREIGN PATENT DOCUMENTS

| | | |
|---|---|---|
| EP | 2509380 A1 | 10/2012 |
| EP | 2849358 A1 | 3/2015 |
| KR | 20140054242 A | 5/2014 |
| WO | 2010140828 A2 | 12/2010 |
| WO | 2013168942 A1 | 11/2013 |

OTHER PUBLICATIONS

Motorola, "Minimum Resource Allocation size and L1/L2 Control Overhead," R1-062063, Aug. 28-Sep. 1, 2006, 3 pages.
Foreign Communication From a Counterpart Application, PCT Application No. PCT/CN2015/071242, English Translation of International Search Report dated Oct. 30, 2015, 3 pages.
Foreign Communication From a Counterpart Application, PCT Application No. PCT/CN2015/071242, English Translation of Written Opinion dated Oct. 30, 2015, 7 pages.
Foreign Communication From a Counterpart Application, European Application No. 15878377.9, Extended European Search Report dated Dec. 4, 2017, 10 pages.
Foreign Communication From A Counterpart Application, Korean Application No. 10-2017-7023206, Korean Notice of Allowance dated Oct. 30, 2019, 2 pages.
Foreign Communication From A Counterpart Application, Korean Application No. 10-2017-7023206, English Translation of Korean Notice of Allowance dated Oct. 30, 2019, 1 page.

\* cited by examiner

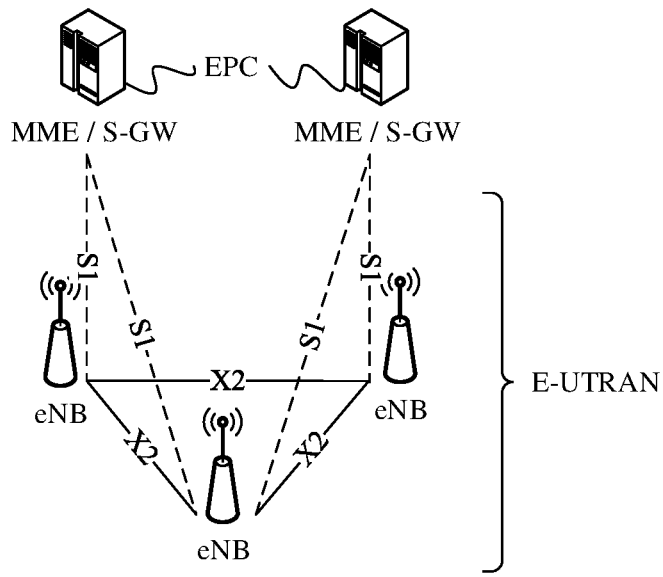

FIG. 1

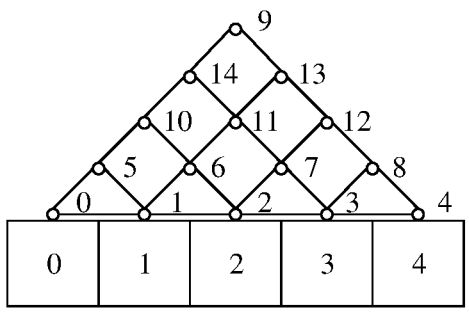

FIG. 2A

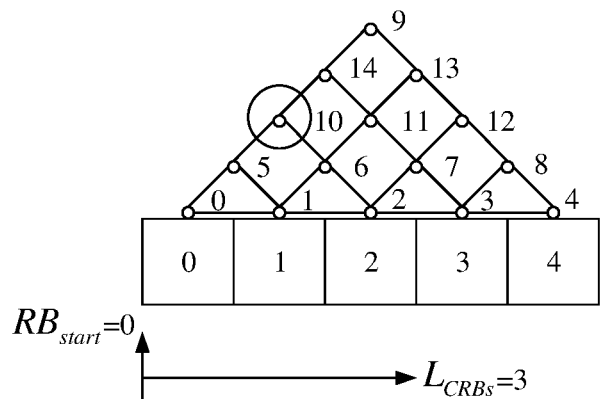

FIG. 2B

A base station determines resource allocation information and resource allocation unit indication information, where the resource allocation information includes information indicating at least one FRB allocated to user equipment, and the resource allocation unit indication information is used for indicating that a resource allocation unit is the FRB, where a resource occupied by the FRB is less than one RB — S301

The base station notifies the user equipment of the resource allocation information and the resource allocation unit indication information — S302

FIG. 3

RESOURCE ALLOCATION METHOD, BASE STATION, AND USER EQUIPMENT

CROSS-REFERENCE TO RELATED APPLICATIONS

This application is a continuation of International Patent Application No. PCT/CN2015/071242 filed on Jan. 21, 2015, which is hereby incorporated by reference in its entirety.

TECHNICAL FIELD

The present disclosure relates to the communications field, and in particular, to a resource allocation method, a base station, and user equipment.

BACKGROUND

Voice over Internet Protocol (IP) (VoIP) mainly refers to a service for transmitting voice over an IP network in the form of data packets. A conventional voice coding scheme usually uses adaptive multi rate (AMR) voice coding. The coding scheme supports eight rates: 12.2 kilobits per second (kb/s), 10 kb/s, 7.95 kb/s, 7.4 kb/s, 6.70 kb/s, 5.90 kb/s, 5.15 kb/s, and 4.75 kb/s, and in addition, it also supports a low-rate (1.80 kb/s) background noise coding mode. To further improve voice coding performance, the $3^{rd}$ Generation Partnership Project (3GPP) defines a new voice coding mode, an enhanced voice service (EVS). At present, standardization for EVS voice source coding is completed, a transport block of a typical-scenario EVS in an air interface is much smaller than a transport block of the conventional AMR, and use of a resource allocation method in the existing Long Term Evolution (LTE) causes a waste of user spectrum resources.

SUMMARY

Embodiments of the present disclosure provide a resource allocation method, a base station, and user equipment to resolve at least a problem that a transport block of a typical-scenario EVS in an air interface is much smaller than a transport block of a conventional AMR, and use of a resource allocation method in the existing LTE causes a waste of user spectrum resources such that spectrum utilization in an EVS scenario can be improved.

To achieve the foregoing objective, the following technical solutions are used in the embodiments of the present disclosure.

According to a first aspect, a resource allocation method is provided, and the method includes determining, by a base station, resource allocation information and resource allocation unit indication information, where the resource allocation information includes information indicating at least one fractional resource block (FRB) allocated to user equipment, and the resource allocation unit indication information is used for indicating that a resource allocation unit is the FRB, where a resource occupied by the FRB is less than one resource block (RB), and notifying, by the base station, the user equipment of the resource allocation information and the resource allocation unit indication information.

In a first possible implementation manner of the first aspect, with reference to the first aspect, notifying, by the base station, the user equipment of the resource allocation information and the resource allocation unit indication information includes sending, by the base station, downlink control information (DCI) to the user equipment, where the DCI includes the resource allocation information and the resource allocation unit indication information, or notifying, by the base station, the user equipment of the resource allocation information and the resource allocation unit indication information includes sending, by the base station, DCI to the user equipment, where the DCI includes the resource allocation information, and sending, by the base station, radio resource control (RRC) signaling to the user equipment, where the RRC signaling includes the resource allocation unit indication information.

In a second possible implementation manner of the first aspect, with reference to the first aspect or the first possible implementation manner of the first aspect, before determining, by a base station, resource allocation information and resource allocation unit indication information, the method further includes determining, by the base station, whether the user equipment can support an FRB, determining, by the base station, a size of an EVS voice packet and a channel condition if the user equipment can support the FRB, and determining, by the base station, that the resource allocation unit is the FRB according to the size of the EVS voice packet and the channel condition, and determining, by a base station, resource allocation information and resource allocation unit indication information includes determining, by the base station, the resource allocation information and the resource allocation unit indication information according to the resource allocation unit.

In a third possible implementation manner of the first aspect, with reference to the first aspect, the first possible implementation manner of the first aspect, or the second possible implementation manner of the first aspect, that the resource allocation information includes information indicating at least one FRB allocated to user equipment includes that the resource allocation information includes a resource indicator value (RIV) if $L_{CFRBs}=1$, where RIV=$FRB_{start}$, $L_{CFRBs}$ indicates a quantity of the at least one FRB continuously allocated to the user equipment, and $FRB_{start}$ indicates a number of a starting FRB in the at least one FRB continuously allocated to the user equipment.

In a fourth possible implementation manner of the first aspect, with reference to the first aspect, the first possible implementation manner of the first aspect, or the second possible implementation manner of the first aspect, that the resource allocation information includes information indicating at least one FRB allocated to user equipment includes that the resource allocation information includes a RIV if $L_{CFRBs}=M1$, where RIV=$N_{FRB}(L_{CFRBs}-1)+FRB_{start}$, $N_{FRB}$ indicates a total quantity of FRBs in a bandwidth, $L_{CFRBs}$ indicates a quantity of the at least one FRB continuously allocated to the user equipment, $FRB_{start}$ indicates a number of a starting FRB in the at least one FRB continuously allocated to the user equipment, and M1 is a positive integer greater than 1.

In a fifth possible implementation manner of the first aspect, with reference to the fourth possible implementation manner of the first aspect, the resource allocation information further includes a segment number of a segmented bandwidth if $L_{CFRBs}=M1$, where the segmented bandwidth is a segment of a system bandwidth after the system bandwidth is segmented.

In a sixth possible implementation manner of the first aspect, with reference to the first aspect, the first possible implementation manner of the first aspect, or the second possible implementation manner of the first aspect, that the resource allocation information includes information indicating at least one FRB allocated to user equipment includes that the resource allocation information includes a RIV and indication information of the quantity of the RBs continuously allocated to the user equipment if $L_{CFRBs}=1+2N$, where a value of N depends on a quantity of RBs continuously allocated to the user equipment, $RIV=FRB_{start}$, $L_{CRBs}=\lceil L_{CFRBs}/2 \rceil$, and $FRB_{start}$ indicates a number of a starting FRB in the at least one FRB continuously allocated to the user equipment, $L_{CRBs}$ indicates the quantity of the RBs continuously allocated to the user equipment, and $N=L_{CRBs}-1$.

In a seventh possible implementation manner of the first aspect, with reference to the first aspect, the first possible implementation manner of the first aspect, or the second possible implementation manner of the first aspect, that the resource allocation information includes information indicating at least one FRB allocated to user equipment includes that the resource allocation information includes a RIV and a number of the at least one FRB allocated to the user equipment in corresponding continuous RBs if $L_{CFRBs}=1$, where $RIV=RB_{start}$, $L_{CRBs}$ where indicates a quantity of the continuous RBs corresponding to the at least one FRB allocated to the user equipment, and $RB_{start}$ indicates a number of a starting RB in the continuous RBs corresponding to the at least one FRB allocated to the user equipment.

In an eighth possible implementation manner of the first aspect, with reference to the first aspect, the first possible implementation manner of the first aspect, or the second possible implementation manner of the first aspect, that the resource allocation information includes information indicating at least one FRB allocated to user equipment includes that the resource allocation information includes a RIV and a number of the at least one FRB allocated to the user equipment in corresponding continuous RBs if $L_{CFRBs}=M2$, where $RIV=N_{RB}(L_{CRBs}-1)+RB_{start}$, $N_{RB}$ indicates a total quantity of RBs in a bandwidth, $L_{CRBs}$ indicates a quantity of the continuous RBs corresponding to the at least one FRB allocated to the user equipment, $RB_{start}$ indicates a number of a starting RB in the continuous RBs corresponding to the at least one FRB allocated to the user equipment, M2 is a positive integer greater than 1, and the at least one FRB allocated to the user equipment has a same number in the corresponding continuous RBs.

In a ninth possible implementation manner of the first aspect, with reference to the eighth possible implementation manner of the first aspect, if $L_{CFRBs}=M2$, the resource allocation information further includes a segment number of a segmented bandwidth, where the segmented bandwidth is a segment of a system bandwidth after the system bandwidth is segmented.

In a tenth possible implementation manner of the first aspect, with reference to the first aspect, the first possible implementation manner of the first aspect, or the second possible implementation manner of the first aspect, that the resource allocation information includes information indicating at least one FRB allocated to user equipment includes that if $1FRB=\frac{1}{4}RB$, $L_{CRBs}=1$, and $L_{CFRBs}=P1$, where $P1=1$, 2, or 3, the resource allocation information includes a first RIV ($RIV_1$) and a second RIV ($RIV_2$), where $RIV_1=RB_{start}$, $RIV_2=4(L_{CFRBs}-1)+FRB_{start}$, $L_{CFRBs}$ indicates a quantity of the at least one FRB continuously allocated to the user equipment, $L_{CRBs}$ indicates a quantity of continuous RBs corresponding to the at least one FRB allocated to the user equipment, $RB_{start}$ indicates a number of a starting RB in the continuous RBs corresponding to the at least one FRB allocated to the user equipment, and $FRB_{start}$ indicates a number of a starting FRB in the at least one FRB continuously allocated to the user equipment.

In an eleventh possible implementation manner of the first aspect, with reference to the first aspect, the first possible implementation manner of the first aspect, or the second possible implementation manner of the first aspect, that the resource allocation information includes information indicating at least one FRB allocated to user equipment includes that if $1FRB=\frac{1}{4}RB$, and $L_{CFRBs}=P2$, where $P2=1$, 2, or 3, the resource allocation information includes a RIV and indication information of a quantity of the at least one FRB continuously allocated to the user equipment, where $RIV=FRB_{start}$, $L_{CFRBs}$ indicates the quantity of the at least one FRB continuously allocated to the user equipment, and $FRB_{start}$ indicates a number of a starting FRB in the at least one FRB continuously allocated to the user equipment.

According to a second aspect, a resource allocation method is provided, and the method includes obtaining, by user equipment, resource allocation information and resource allocation unit indication information according to a notification sent by a base station to the user equipment, where the resource allocation information includes information indicating at least one FRB allocated to the user equipment, and the resource allocation unit indication information is used for indicating that a resource allocation unit is the FRB, where the notification sent by the base station to the user equipment includes the resource allocation information and the resource allocation unit indication information, and a resource occupied by the FRB is less than one RB, and performing, by the user equipment, data transmission according to the resource allocation information and the resource allocation unit indication information.

In a first possible implementation manner of the second aspect, with reference to the second aspect, obtaining, by user equipment, resource allocation information and resource allocation unit indication information according to a notification sent by a base station to the user equipment includes receiving, by the user equipment, DCI sent by the base station, where the DCI includes the resource allocation information and the resource allocation unit indication information, or obtaining, by user equipment, resource allocation information and resource allocation unit indication information according to a notification sent by a base station to the user equipment includes receiving, by the user equipment, DCI sent by the base station, where the DCI includes the resource allocation information, and receiving, by the user equipment, RRC signaling sent by the base station, where the RRC signaling includes the resource allocation unit indication information.

According to a third aspect, a base station is provided, and the base station includes a determining unit and a sending unit, where the determining unit is configured to determine resource allocation information and resource allocation unit indication information, where the resource allocation information includes information indicating at least one FRB allocated to user equipment, and the resource allocation unit indication information is used for indicating that a resource allocation unit is the FRB, where a resource occupied by the FRB is less than one RB, and the sending unit is configured to notify the user equipment of the resource allocation information and the resource allocation unit indication information.

In a first possible implementation manner of the third aspect, with reference to the third aspect, the sending unit is further configured to send DCI to the user equipment, where the DCI includes the resource allocation information and the resource allocation unit indication information, or the sending unit is further configured to send DCI to the user equipment, where the DCI includes the resource allocation information, and send RRC signaling to the user equipment, where the RRC signaling includes the resource allocation unit indication information.

In a second possible implementation manner of the third aspect, with reference to the third aspect or the first possible implementation manner of the third aspect, the determining unit is further configured to determine, before determining the resource allocation information and the resource allocation unit indication information, whether the user equipment can support an FRB, and determine, if the user equipment can support the FRB, a size of an EVS voice packet and a channel condition, and determine that the resource allocation unit is the FRB according to the size of the EVS voice packet and the channel condition, and the determining unit is further configured to determine the resource allocation information and the resource allocation unit indication information according to the resource allocation unit.

In a third possible implementation manner of the third aspect, with reference to the third aspect, the first possible implementation manner of the third aspect, or the second possible implementation manner of the third aspect, that the resource allocation information includes information indicating at least one FRB allocated to user equipment includes that the resource allocation information includes a RIV if $L_{CFRBs}=1$, where RIV=$FRB_{start}$, $L_{CFRBs}$ indicates a quantity of the at least one FRB continuously allocated to the user equipment, and $FRB_{start}$ indicates a number of a starting FRB in the at least one FRB continuously allocated to the user equipment.

In a fourth possible implementation manner of the third aspect, with reference to the third aspect, the first possible implementation manner of the third aspect, or the second possible implementation manner of the third aspect, that the resource allocation information includes information indicating at least one FRB allocated to user equipment includes that the resource allocation information includes a RIV if $L_{CFRBs}=M1$, where RIV=$N_{FRB}(L_{CFRBs}-1)+FRB_{start}$, $N_{FRB}$ indicates a total quantity of FRBs in a bandwidth, $L_{CFRBs}$ indicates a quantity of the at least one FRB continuously allocated to the user equipment, $L_{CFRBs}$ indicates a number of a starting FRB in the at least one FRB continuously allocated to the user equipment, and M1 is a positive integer greater than 1.

In a fifth possible implementation manner of the third aspect, with reference to the fourth possible implementation manner of the third aspect, if $L_{CFRBs}=M1$, the resource allocation information further includes a segment number of a segmented bandwidth, where the segmented bandwidth is a segment of a system bandwidth after the system bandwidth is segmented.

In a sixth possible implementation manner of the third aspect, with reference to the third aspect, the first possible implementation manner of the third aspect, or the second possible implementation manner of the third aspect, that the resource allocation information includes information indicating at least one FRB allocated to user equipment includes that the resource allocation information includes a RIV and indication information of the quantity of the RBs continuously allocated to the user equipment if $L_{CFRBs}=1+2N$, where a value of N depends on a quantity of RBs continuously allocated to the user equipment, RIV=$FRB_{start}$, $L_{CRBs}=\lceil L_{CFRBs}/2 \rceil$, and $FRB_{start}$ indicates a number of a starting FRB in the at least one FRB continuously allocated to the user equipment, $L_{CRBs}$ indicates the quantity of the RBs continuously allocated to the user equipment, and $N=L_{CRBs}-1$.

In a seventh possible implementation manner of the third aspect, with reference to the third aspect, the first possible implementation manner of the third aspect, or the second possible implementation manner of the third aspect, that the resource allocation information includes information indicating at least one FRB allocated to user equipment includes that the resource allocation information includes a RIV and a number of the at least one FRB allocated to the user equipment in corresponding continuous RBs if $L_{CFRBs}=1$, where RIV=$RB_{start}$, $L_{CRBs}$ indicates a quantity of the continuous RBs corresponding to the at least one FRB allocated to the user equipment, and $RB_{start}$ indicates a number of a starting RB in the continuous RBs corresponding to the at least one FRB allocated to the user equipment.

In an eighth possible implementation manner of the third aspect, with reference to the third aspect, the first possible implementation manner of the third aspect, or the second possible implementation manner of the third aspect, that the resource allocation information includes information indicating at least one FRB allocated to user equipment includes that the resource allocation information includes a RIV and a number of the at least one FRB allocated to the user equipment in corresponding continuous RBs if $L_{CFRBs}=M2$, where RIV=$N_{RB}(L_{CRBs}-1)+RB_{start}$, $N_{RB}$ indicates a total quantity of RBs in a bandwidth, $L_{CRBs}$ indicates a quantity of the continuous RBs corresponding to the at least one FRB allocated to the user equipment, $RB_{start}$ indicates a number of a starting RB in the continuous RBs corresponding to the at least one FRB allocated to the user equipment, M2 is a positive integer greater than 1, and the at least one FRB allocated to the user equipment has a same number in the corresponding continuous RBs.

In a ninth possible implementation manner of the third aspect, with reference to the eighth possible implementation manner of the third aspect, if $L_{CFRBs}=M2$, the resource allocation information further includes a segment number of a segmented bandwidth, where the segmented bandwidth is a segment of a system bandwidth after the system bandwidth is segmented.

In a tenth possible implementation manner of the third aspect, with reference to the third aspect, the first possible implementation manner of the third aspect, or the second possible implementation manner of the third aspect, that the resource allocation information includes information indicating at least one FRB allocated to user equipment includes that if 1FRB=¼RB, $L_{CRBs}=1$, and $L_{CFRBs}=P1$, where P1=1, 2, or 3, the resource allocation information includes an $RIV_1$ and the $RIV_2$, where $RIV_1=RB_{start}$, $RIV_2=4(L_{CFRBs}-1)+FRB_{start}$, $L_{CFRBs}$ indicates a quantity of the at least one FRB continuously allocated to the user equipment, $L_{CRBs}$ indicates a quantity of continuous RBs corresponding to the at least one FRB allocated to the user equipment, $RB_{start}$ indicates a number of a starting RB in the continuous RBs corresponding to the at least one FRB allocated to the user equipment, and $FRB_{start}$ indicates a number of a starting FRB in the at least one FRB continuously allocated to the user equipment.

In an eleventh possible implementation manner of the third aspect, with reference to the third aspect, the first possible implementation manner of the third aspect, or the second possible implementation manner of the third aspect, that the resource allocation information includes information indicating at least one FRB allocated to user equipment includes that if 1FRB=¼RB, and $L_{CFRBs}=P2$, where P2=1, 2, or 3, the resource allocation information includes a RIV and indication information of a quantity of the at least one FRB continuously allocated to the user equipment, where RIV=$FRB_{start}$, $L_{CFRBs}$ indicates the quantity of the at least one FRB continuously allocated to the user equipment, and $FRB_{start}$ indicates a number of a starting FRB in the at least one FRB continuously allocated to the user equipment.

According to a fourth aspect, user equipment is provided, and the user equipment includes an obtaining unit and a transceiver unit, where the obtaining unit is configured to obtain resource allocation information and resource allocation unit indication information according to a notification sent by a base station to the user equipment, where the resource allocation information includes information indicating at least one FRB allocated to the user equipment, and the resource allocation unit indication information is used for indicating that a resource allocation unit is the FRB, where the notification sent by the base station to the user equipment includes the resource allocation information and the resource allocation unit indication information, and a resource occupied by the FRB is less than one RB, and the transceiver unit is configured to perform data transmission according to the resource allocation information and the resource allocation unit indication information.

In a first possible implementation manner of the fourth aspect, with reference to the fourth aspect, the obtaining unit is further configured to receive DCI sent by the base station, where the DCI includes the resource allocation information and the resource allocation unit indication information, or the obtaining unit is further configured to receive DCI sent by the base station, where the DCI includes the resource allocation information, and receive RRC signaling sent by the base station, where the RRC signaling includes the resource allocation unit indication information.

According to a fifth aspect, a base station is provided, and the base station includes a processor and a transmitter, where the processor is configured to determine resource allocation information and resource allocation unit indication information, where the resource allocation information includes information indicating at least one FRB allocated to user equipment, and the resource allocation unit indication information is used for indicating that a resource allocation unit is the FRB, where a resource occupied by the FRB is less than one RB, and the transmitter is configured to notify the user equipment of the resource allocation information and the resource allocation unit indication information.

In a first possible implementation manner of the fifth aspect, with reference to the fifth aspect, the transmitter is further configured to send DCI to the user equipment, where the DCI includes the resource allocation information and the resource allocation unit indication information, or the transmitter is further configured to send DCI to the user equipment, where the DCI includes the resource allocation information, and send RRC signaling to the user equipment, where the RRC signaling includes the resource allocation unit indication information.

In a second possible implementation manner of the fifth aspect, with reference to the fifth aspect or the first possible implementation manner of the fifth aspect, the processor is further configured to determine, before determining the resource allocation information and the resource allocation unit indication information, whether the user equipment can support an FRB, and determine, if the user equipment can support the FRB, a size of an EVS voice packet and a channel condition, and determine that the resource allocation unit is the FRB according to the size of the EVS voice packet and the channel condition, and the processor is further configured to determine the resource allocation information and the resource allocation unit indication information according to the resource allocation unit.

In a third possible implementation manner of the fifth aspect, with reference to the fifth aspect, the first possible implementation manner of the fifth aspect, or the second possible implementation manner of the fifth aspect, that the resource allocation information includes information indicating at least one FRB allocated to user equipment includes that the resource allocation information includes a RIV if $L_{CFRBs}$=1, where RIV=$FRB_{start}$, $L_{CFRBs}$ indicates a quantity of the at least one FRB continuously allocated to the user equipment, and $FRB_{start}$ indicates a number of a starting FRB in the at least one FRB continuously allocated to the user equipment.

In a fourth possible implementation manner of the fifth aspect, with reference to the fifth aspect, the first possible implementation manner of the fifth aspect, or the second possible implementation manner of the fifth aspect, that the resource allocation information includes information indicating at least one FRB allocated to user equipment includes that the resource allocation information includes a RIV if $L_{CFRBs}$=M1, where RIV=$N_{FRB}(L_{CFRBs}-1)+FRB_{start}$, $N_{FRB}$ indicates a total quantity of FRBs in a bandwidth, $L_{CFRBs}$ indicates a quantity of the at least one FRB continuously allocated to the user equipment, $FRB_{start}$ indicates a number of a starting FRB in the at least one FRB continuously allocated to the user equipment, and M1 is a positive integer greater than 1.

In a fifth possible implementation manner of the fifth aspect, with reference to the fourth possible implementation manner of the fifth aspect, if $L_{CFRBs}$=M1, the resource allocation information further includes a segment number of a segmented bandwidth, wherein the segmented bandwidth is a segment of a system bandwidth after the system bandwidth is segmented.

In a sixth possible implementation manner of the fifth aspect, with reference to the fifth aspect, the first possible implementation manner of the fifth aspect, or the second possible implementation manner of the fifth aspect, that the resource allocation information includes information indicating at least one FRB allocated to user equipment includes that if $L_{CFRBs}$=1+2N, where a value of N depends on a quantity of RBs continuously allocated to the user equipment, the resource allocation information includes a RIV and indication information of the quantity of the RBs continuously allocated to the user equipment, where RIV=$FRB_{start}$, $L_{CRBs}$=$\lceil L_{CFRBs}/2 \rceil$, $FRB_{start}$ indicates a number of a starting FRB in the at least one FRB continuously allocated to the user equipment, $L_{CRBs}$ indicates the quantity of the RBs continuously allocated to the user equipment, and N=$L_{CRBs}$-1.

In a seventh possible implementation manner of the fifth aspect, with reference to the fifth aspect, the first possible implementation manner of the fifth aspect, or the second possible implementation manner of the fifth aspect, that the resource allocation information includes information indicating at least one FRB allocated to user equipment includes that the resource allocation information includes a RIV and a number of the at least one FRB allocated to the user equipment in corresponding continuous RBs if $L_{CFRBs}$=1, where RIV=$RB_{start}$, $L_{CRBs}$ indicates a quantity of the continuous RBs corresponding to the at least one FRB allocated to the user equipment, and $RB_{start}$ indicates a number of a starting RB in the continuous RBs corresponding to the at least one FRB allocated to the user equipment.

In an eighth possible implementation manner of the fifth aspect, with reference to the fifth aspect, the first possible implementation manner of the fifth aspect, or the second possible implementation manner of the fifth aspect, that the resource allocation information includes information indicating at least one FRB allocated to user equipment includes that the resource allocation information includes a RIV and a number of the at least one FRB allocated to the user equipment in corresponding continuous RBs if $L_{CFRBs}$=M2, where RIV=$N_{RB}(L_{CRBs}-1)+RB_{start}$, $N_{RB}$ indicates a total quantity of RBs in a bandwidth, $L_{CRBs}$ indicates a quantity of the continuous RBs corresponding to the at least one FRB allocated to the user equipment, $RB_{start}$ indicates a number of a starting RB in the continuous RBs corresponding to the at least one FRB allocated to the user equipment, M2 is a positive integer greater than 1, and the at least one FRB allocated to the user equipment has a same number in the corresponding continuous RBs.

In a ninth possible implementation manner of the ninth aspect, with reference to the eighth possible implementation manner of the ninth aspect, if $L_{CFRBs}$=M2, the resource allocation information further includes a segment number of a segmented bandwidth, where the segmented bandwidth is a segment of a system bandwidth after the system bandwidth is segmented.

In a tenth possible implementation manner of the fifth aspect, with reference to the fifth aspect, the first possible implementation manner of the fifth aspect, or the second possible implementation manner of the fifth aspect, that the resource allocation information includes information indicating at least one FRB allocated to user equipment includes that if 1FRB=¼RB, $L_{CRBs}$=1, and $L_{CFRBs}$=P1, where P1=1, 2, or 3, the resource allocation information includes an $RIV_1$ and an $RIV_2$, where $RIV_1$=$RB_{start}$, $RIV_2$=$4(L_{CFRBs}-1)$+$FRB_{start}$, $L_{CFRBs}$ indicates a quantity of the at least one FRB continuously allocated to the user equipment, $L_{CRBs}$ indicates a quantity of continuous RBs corresponding to the at least one FRB allocated to the user equipment, $RB_{start}$ indicates a number of a starting RB in the continuous RBs corresponding to the at least one FRB allocated to the user equipment, and $FRB_{start}$ indicates a number of a starting FRB in the at least one FRB continuously allocated to the user equipment.

In an eleventh possible implementation manner of the fifth aspect, with reference to the fifth aspect, the first possible implementation manner of the fifth aspect, or the second possible implementation manner of the fifth aspect, that the resource allocation information includes information indicating at least one FRB allocated to user equipment includes that if 1FRB=¼RB, and $L_{CFRBs}$=P2, where P2=1, 2, or 3, the resource allocation information includes a RIV and indication information of a quantity of the at least one FRB continuously allocated to the user equipment, where RIV=$FRB_{start}$, $L_{CFRBs}$ indicates the quantity of the at least one FRB continuously allocated to the user equipment, and $FRB_{start}$ indicates a number of a starting FRB in the at least one FRB continuously allocated to the user equipment.

According to a sixth aspect, user equipment is provided, and the user equipment includes a processor and a transceiver, where the processor is configured to obtain resource allocation information and resource allocation unit indication information according to a notification sent by a base station to the user equipment, where the resource allocation information includes information indicating at least one FRB allocated to the user equipment, and the resource allocation unit indication information is used for indicating that a resource allocation unit is the FRB, where the notification sent by the base station to the user equipment includes the resource allocation information and the resource allocation unit indication information, and a resource occupied by the FRB is less than one RB, and the transceiver is configured to perform data transmission according to the resource allocation information and the resource allocation unit indication information.

In a first possible implementation manner of the sixth aspect, with reference to the sixth aspect, the processor is further configured to receive DCI sent by the base station, where the DCI includes the resource allocation information and the resource allocation unit indication information, or the processor is further configured to receive DCI sent by the base station, where the DCI includes the resource allocation information, and receive RRC signaling sent by the base station, where the RRC signaling includes the resource allocation unit indication information.

Based on the resource allocation method, the base station, and the user equipment provided in the embodiments of the present disclosure, resource allocation information in the embodiments of the present disclosure includes information indicating at least one FRB allocated to user equipment, that is, during resource allocation, an FRB may be allocated to the user equipment, where a resource occupied by the FRB is less than one RB. In this way, when transmission of one EVS voice packet does not need one RB, only an FRB smaller than an RB may be allocated to the user equipment. This is unlike the prior art in which a minimum resource allocation granularity is always per RB, and when the transmission of one EVS voice packet does not need one RB, one RB is still allocated to the user equipment, resulting in a waste of user spectrum resources. Spectrum utilization in an EVS scenario is improved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

FIG. 1 is a schematic structural diagram of an LTE system;

FIG. 2A and FIG. 2B show a representational schematic diagram of a RIV;

FIG. 3 is a schematic flowchart 1 of a resource allocation method according to an embodiment of the present disclosure;

DESCRIPTION OF EMBODIMENTS

Figure 4:
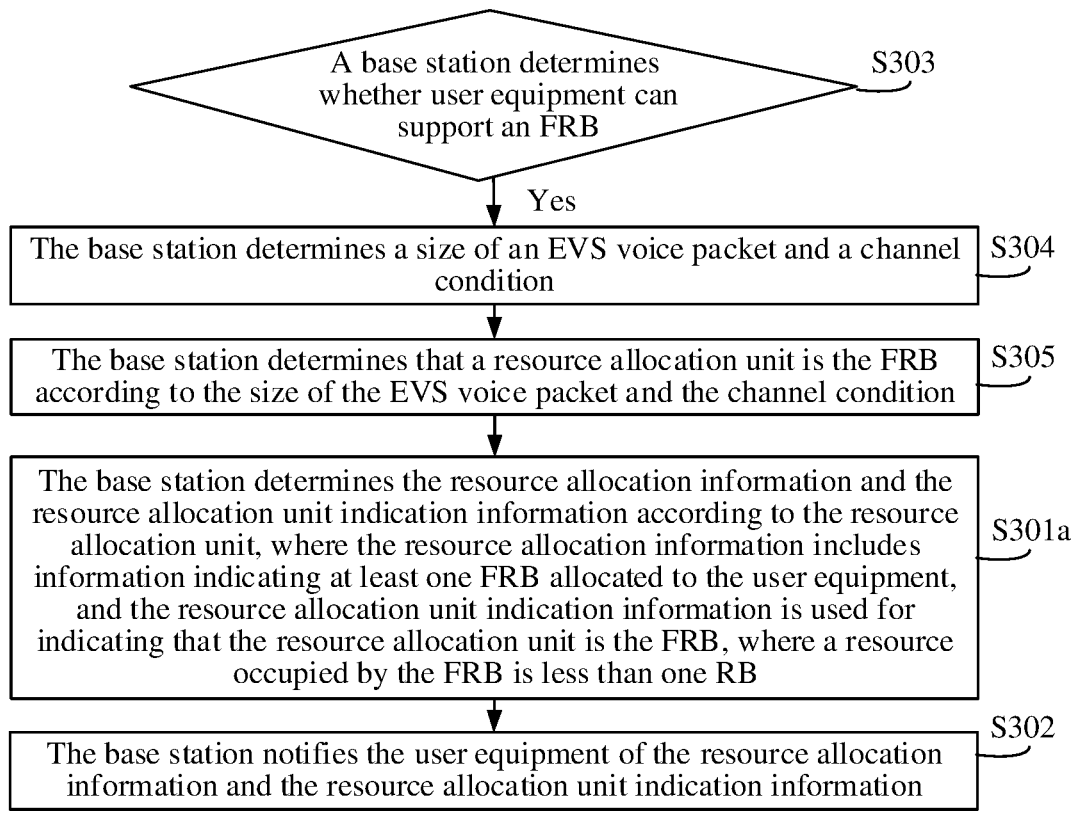
FIG. 4 is a schematic flowchart 2 of a resource allocation method according to an embodiment of the present disclosure.

For a clear and concise description of the following embodiments, several brief introductions are provided first.

First, an LTE system architecture includes the following description.

The entire LTE system includes three parts, an evolved packet core (EPC), an evolved NodeB (eNB), and user equipment. A signaling processing part of the EPC is a mobility management entity (MME), and a data processing part is a serving gateway (S-GW). The eNB is responsible for an access network part, which is also referred to as an evolved universal terrestrial radio access network (E-UTRAN). As shown in FIG. 1, the eNB is connected to the EPC using an S1 interface. The eNBs are connected to each other using an X2 interface. In addition, the eNB is connected to the user equipment (not shown) using a Uu interface (not shown).

Second, downlink resource allocation manners defined in the LTE are type 0, type 1, and type 2.

First, in the type 0, resource allocation is performed on a per RB group (RBG) basis. In the type 1 and the type 2, resource allocation is performed on a per RB basis. The RBG includes several continuous RBs, and a quantity (P) of the continuous RBs included in the RBG is a function about a system bandwidth, as shown in Table 1.

TABLE 1

| System bandwidth | Size of an RBG |
| --- | --- |
| $N_{RB}^{DL}$ | P |
| ≤10 | 1 |
| 11-26 | 2 |
| 27-63 | 3 |
| 64-110 | 4 |

Second, resource allocation information of the type 0 and the type 1 is expressed using a RB allocation field in DCI and bits needed for resource allocation are $\lceil N_{RB}^{DL}/P \rceil$. Quantities of bits for resource allocation of the type 0 and the type 1 in different bandwidths are shown in Table 2. If a corresponding bit is 1, it indicates that an RBG corresponding to the bit is occupied.

TABLE 2

| Bandwidth in megahertz (MHz) | Quantity of RBs | P | Quantity of bits |
| --- | --- | --- | --- |
| 1.4 | 6 | 1 | 6 |
| 3 | 15 | 2 | 8 |
| 5 | 25 | 2 | 13 |
| 10 | 50 | 3 | 17 |
| 15 | 75 | 4 | 19 |
| 20 | 100 | 4 | 25 |

The resource allocation information of the type 1 includes three fields in the RB allocation field of the DCI.

A first field has $\lceil \log_2(p) \rceil$ bits, and is used for indicating a RB subset selected by the type 1.

A second field has one bit, and is used for indicating a resource allocation range offset in the subset.

A third field has $(\lceil N_{RB}^{DL}/P \rceil - \lceil \log_2(P) \rceil - 1)$ bits. Each bit corresponds to an RB in a selected RBG subset.

Further, in the type 2, a RIV is used to indicate an allocated resource, and bits needed for resource allocation are $\lceil \log_2(N_{RB}^{DL}(N_{RB}^{DL}+1)/2) \rceil$. Quantities of bits for resource allocation of the type 2 on different bandwidths are shown in Table 3.

TABLE 3

| Bandwidth (MHz) | Quantity of RBs | Quantity of bits |
| --- | --- | --- |
| 1.4 | 6 | 5 |
| 3 | 15 | 7 |
| 5 | 25 | 9 |
| 10 | 50 | 11 |
| 15 | 75 | 12 |
| 20 | 100 | 13 |

A RIV calculation manner in the protocol is as follows:

if $(L_{CRBs}-1) \leq \lfloor N_{RB}^{DL}/2 \rfloor$ then $RIV = N_{RB}^{DL}(L_{CRBs}-1) + RB_{START}$ else $RIV = N_{RB}^{DL}(N_{RB}^{DL}-L_{CRBs}+1) + (N_{RB}^{DL}-1-RB_{START})$ $L_{CRBs}$ indicates a length of RBs that are continuously allocated, and $RB_{start}$ corresponds to a location of a starting RB.

It should be noted that a RIV value obtained through calculation using the foregoing formula may be expressed using a binary-tree. For example, as shown in FIG. 2A, it indicates a meaning of each RIV value when $N_{RB}^{DL}=5$. Assuming that RBs allocated to scheduled user equipment are $RB_{start}=0$, and $L_{CRBs}=3$, that is, three RBs are allocated starting from a $0^{th}$ index, calculation is performed according to the foregoing formula, because $(L_{CRBs}-1) \leq \lfloor N_{RB}^{DL}/2 \rfloor$, a formula $RIV = N_{RB}^{DL}(L_{CRBs}-1) + RB_{START} = 5*(3-1) + 0 = 5*2 = 10$ needs to be used, and a result is shown by the circle in FIG. 2B. Certainly, the RIV may be represented using another method. This is not limited in the embodiments of the present disclosure.

Third, for uplink resource allocation manners type 0 and type 1 defined in the LTE.

First, like the downlink type 2, in the uplink type 0, resources are continuously allocated, and a RIV is used to indicate a starting location of an RB and a length of the allocated RB. Bits needed for resource allocation are $\lceil \log_2(N_{RB}^{UL}(N_{RB}^{UL}+1)/2) \rceil$.

A RIV calculation manner in the protocol is:

if $(L_{CRBs}-1) \leq \lfloor N_{RB}^{UL}/2 \rfloor$ then $RIV = N_{RB}^{UL}(L_{CRBs}-1) + RB_{START}$ else $RIV = N_{RB}^{UL}(N_{RB}^{UL}-L_{CRBs}+1) + (N_{RB}^{UL}-1-RB_{START})$ $L_{CRBs}$ indicates a length of RBs that are continuously allocated, and $RB_{start}$ corresponds to a location of a starting RB.

Second, in the uplink type 1, discontinuous resources in a frequency field are allocated to the user equipment, frequency hopping is not supported, and two RB sets are allocated to the UE. Each RB set includes one or more continuous RBGs each having a size of P. Indexes of a starting RBG and an ending RBG in an RB set 1 are $S_0$ and $S_1-1$, and indexes of a starting RBG and an ending RBG in an RB set 2 is $S_2$ and $S_3-1$.

An RB allocation field in a DCI format 4 indicates a combination exponent r:

$$r = \sum_{i=0}^{M-1} \binom{N-s_i}{M-i},$$

where $$\binom{x}{y} = \begin{cases} \binom{x}{y} & x \geq y \\ 0 & x < y \end{cases},$$

M=4, and $N = \lceil N_{RB}^{UL}/P \rceil + 1$.

Therefore, a quantity of bits included in r is $$\left\lceil \log_2 \left( \binom{\lceil N_{RB}^{UL}/P \rceil + 1}{4} \right) \right\rceil.$$

Bits needed for resource allocation are:

$$\max\left( \lceil \log_2(N_{RB}^{UL}(N_{RB}^{UL}+1)/2) \rceil, \left\lceil \log_2 \left( \binom{\lceil N_{RB}^{UL}/P \rceil + 1}{4} \right) \right\rceil \right).$$

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

It should be noted that in the embodiments of the present disclosure, a physical RB (PRB), a virtual RB (VRB), a PRB pair, and a virtual VRB pair may all be referred to as RB. A fractional PRB (FPRB), a fractional VRB (FVRB), a fractional PRB pair (FPRB pair), and a fractional VRB pair (FVRB pair) may all be referred to as FRB.

It should be noted that for ease of describing technical solutions of the embodiments of the present disclosure clearly, in the embodiments of the present disclosure, words such as "first" and "second" are used to distinguish same items or similar items having same functions and roles, and a person skilled in the art may understand that the words such as "first" and "second" do not limit a quantity or an execution sequence.

Embodiment 1

This embodiment of the present disclosure provides a resource allocation method, which may be applied to a base station in an LTE system shown in FIG. 1. As shown in FIG. 3, the method includes the following steps.

Step S301: A base station determines resource allocation information and resource allocation unit indication information, where the resource allocation information includes information indicating at least one FRB allocated to user equipment, and the resource allocation unit indication information is used for indicating that a resource allocation unit is the FRB, where a resource occupied by the FRB is less than one RB.

Further, in this embodiment of the present disclosure, a minimum resource allocation granularity of the base station is per FRB, and the resource allocation information includes the information indicating the at least one FRB allocated to the user equipment.

It should be noted that in this embodiment of the present disclosure, the resource allocation unit FRB that is indicated by the resource allocation unit indication information determined by the base station is a type of FRB. The FRB may be ½ RB, ¼ RB, or of another size. The information about the at least one FRB allocated to the user equipment may include information such as a quantity or a location of FRBs allocated to the user equipment. This is not limited in this embodiment of the present disclosure.

For example, assuming that the resource allocation unit is ½ RB, and the base station allocates a resource of three ½ RBs (that is, 1.5 RBs) to the user equipment, the resource allocation unit that is indicated by the resource allocation unit indication information determined by the base station is ½ RB, the resource allocation information includes information indicating three FRBs allocated to the user equipment, and the information about the three FRBs may include a quantity and a location of the FRBs allocated to the user equipment.

Step S302: The base station notifies the user equipment of the resource allocation information and the resource allocation unit indication information.

In a possible implementation manner, that the base station notifies the user equipment of the resource allocation information and the resource allocation unit indication information includes sending, by the base station, DCI to the user equipment, where the DCI includes the resource allocation information and the resource allocation unit indication information.

Usually, a corresponding bit may be added to the DCI to indicate the resource allocation unit. For example, 1-bit information may be added to the DCI to indicate whether the resource allocation unit is an RB or an FRB.

In another possible implementation manner, that the base station notifies the user equipment of the resource allocation information and the resource allocation unit indication information includes sending, by the base station, DCI to the user equipment, where the DCI includes the resource allocation information, and sending, by the base station, RRC signaling to the user equipment, where the RRC signaling includes the resource allocation unit indication information.

For example, the RRC signaling may be used to notify the user equipment of whether the resource allocation unit is an RB or an FRB.

It may be understood that in this embodiment of the present disclosure, the base station may notify the user equipment of the resource allocation information and the resource allocation unit indication information in another manner, for example, notifying the user equipment using another message or signaling. This is not limited to the foregoing two specific implementation manners.

Further, as shown in FIG. 4, in the resource allocation method provided in this embodiment of the present disclosure, before the base station determines the resource allocation information and the resource allocation unit indication information (step S301), the method may further include the following steps.

Step S303: A base station determines whether the user equipment can support an FRB.

Further, considering that the user equipment may be conventional user equipment, that is, it is possible that the user equipment cannot support an FRB, in this embodiment of the present disclosure, the base station first determines whether the user equipment can support an FRB.

If the user equipment can support the FRB, step S304 is performed.

If the user equipment cannot support the FRB, a conventional resource allocation method is used, and resource allocation is performed on a per RB basis. This is not limited in this embodiment of the present disclosure.

It should be noted that the user equipment may report a capability (including whether the FRB is supported) of the user equipment to the base station, and the base station may determine, according to the capability of the user equipment, whether the user equipment can support the FRB. This is not limited in this embodiment of the present disclosure.

Step S304: The base station determines a size of an EVS voice packet and a channel condition.

Step S305: The base station determines that a resource allocation unit is the FRB according to the size of the EVS voice packet and the channel condition.

Further, that a base station determines resource allocation information and resource allocation unit indication information (step S301) may include the following steps.

Step S301a: The base station determines the resource allocation information and the resource allocation unit indication information according to the resource allocation unit, where the resource allocation information includes information indicating at least one FRB allocated to the user equipment, and the resource allocation unit indication information is used for indicating that the resource allocation unit is the FRB, where a resource occupied by the FRB is less than one RB.

That is, after determining that the resource allocation unit is the FRB, the base station may determine the resource allocation information and the resource allocation unit indication information according to the resource allocation unit. This is not limited in this embodiment of the present disclosure.

Further, in this embodiment of the present disclosure, the base station determines the resource allocation unit according to the size of the EVS voice packet and the channel condition.

For example, assuming that a coding rate used by an EVS is 5.9 kilobits per second (Kbps), in this case, sizes of media access control (MAC) protocol data units (PDU) corresponding to three coding rates, 2.8 Kbps, 7.2 Kbps, and 8.0 Kbps in this scenario are 136 bits, 224 bits, and 240 bits respectively. At a given time point, it is assumed that the size of the corresponding voice packet is 224 bits.

Assuming that the user equipment reports a channel quality indicator (CQI), that is, a modulation and coding scheme (MCS) index corresponding to the channel condition of the user equipment is MCS=26, according to Table 4, it is first obtained that a transport block size (TBS) index corresponding to the MCS is equal to 24.

TABLE 4

| MCS index | Modulation order | TBS index ($I_{TBS}$) |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | Reserved |
| 30 | 4 | |
| 31 | 6 | |

Next, it can be known by searching Table 5 according to the foregoing obtained TBS index (TBS index=4) that if a conventional resource allocation solution is used, and in this case, an RB is allocated to the user equipment, a corresponding TBS is 584. The size of the corresponding voice packet in this example is 224 bits. For a user that can support the FRB, because 584>2*224, that is, the TBS is greater than two times of the size of the voice packet, ½ RB may be allocated to the user, and the resource allocation unit may be ½ RB.

TABLE 5

| | System bandwidth ($N_{RB}$) | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |

TABLE 5-continued

| | \multicolumn{10}{c}{System bandwidth ($N_{RB}$)} |
|---|---|---|---|---|---|---|---|---|---|---|
| $I_{TBS}$ | 1 | 2 | 3 | 4 | 5 | 6 | 7 | 8 | 9 | 10 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

It should be noted that a manner of determining the resource allocation unit by the base station according to the size of the EVS voice packet and the channel condition is listed above merely as an example. Certainly, there may be other possible implementation manners. This is not limited in this embodiment of the present disclosure.

It should be noted that if the base station determines that the resource allocation unit is an RB according to the size of the EVS voice packet and the channel condition, the conventional resource allocation method may be used, and resource allocation is performed on a per RB basis. This is not limited to this embodiment of the present disclosure.

Further, in this embodiment of the present disclosure, the resource allocation information may be indicated using multiple methods. For example, several manners listed below may be included.

First Manner:

That the resource allocation information includes information indicating at least one FRB allocated to the user equipment includes that if $L_{CFRBs}=1$, the resource allocation information includes a RIV, where RIV=$FRB_{start}$, $L_{CFRBs}$ indicates a quantity of the at least one FRB continuously allocated to the user equipment, and $FRB_{start}$ indicates a number of a starting FRB in the at least one FRB continuously allocated to the user equipment.

For example, if the resource allocation unit is ½ RB, when the EVS voice packet is less than or equal to ½ RB, one FRB is allocated to the user equipment. Assuming that $FRB_{start}=3$, in this case, the resource allocation information includes a RIV, where RIV=$FRB_{start}=3$.

After receiving the resource allocation information and the resource allocation unit indication information, the user equipment may determine, according to a value of the RIV, that a location of a resource allocated by the base station to the user equipment is a location corresponding to an FRB numbered 3.

It should be noted that in this implementation manner, FRBs in a bandwidth need to be numbered first. For example, using a bandwidth of 10 megabytes (MB) (50 RBs) as an example, if the resource allocation unit is ½ RB, the FRBs in the bandwidth need to be numbered from 0 to 99 first.

It should be noted that, to be compatible with all bandwidths and all DCI formats, in this implementation manner, a size of a DCI RB allocation field in the existing resource allocation method may not be changed. For example, an objective of having a same size as an RB allocation field in previous DCI may be achieved by adding idle bits. This is not limited in this embodiment of the present disclosure.

It should be noted that this implementation manner not only can be applied to downlink resource allocation, but also can be applied to uplink resource allocation. This is not limited in this embodiment of the present disclosure.

Second Manner:

That the resource allocation information includes information indicating at least one FRB allocated to the user equipment includes that if $L_{CFRBs}=M1$, the resource allocation information includes a RIV, where RIV=$N_{FRB}(L_{CFRBs}-1)+FRB_{start}$, $N_{FRB}$ indicates a total quantity of FRBs in a bandwidth, $L_{CFRBs}$ indicates a quantity of the at least one FRB continuously allocated to the user equipment, $FRB_{start}$ indicates a number of a starting FRB in the at least one FRB continuously allocated to the user equipment, and M1 is a positive integer greater than 1.

For example, the resource allocation unit is ½ RB, and the quantity M1 of FRBs allocated to the user equipment is 3. Assuming that $N_{FRB}=5$, and $FRB_{start}=0$, in this case, the resource allocation information includes a RIV, where RIV=$N_{FRB}(L_{CFRBs}-1)+FRB_{start}=10$.

After receiving the resource allocation information and the resource allocation unit indication information, the user equipment may determine, according to a value of the RIV, a location of a resource allocated by the base station to the user equipment. With reference to FIG. 2, it is easily obtained that the location of the resource allocated to a user is locations corresponding to FRBs numbered 0, 1, and 2.

It should be noted that FIGS. 2A and 2B is a schematic diagram of a RIV using an RB as a resource allocation unit, and certainly, it may also indicate a RIV using an FRB as a resource allocation unit. This is not limited in this embodiment of the present disclosure.

It should be noted that in this implementation manner, FRBs in a bandwidth need to be numbered first. For example, using a bandwidth of 10 MB (50 RBs) as an example, if the resource allocation unit is ½ RB, the FRBs in the bandwidth need to be numbered from 0 to 99 first.

It should be noted that, to be compatible with all bandwidths and all DCI formats, in this implementation manner, a size of a DCI RB allocation field in the existing resource allocation method may not be changed. For example, an objective of having a same size as an RB allocation field in previous DCI may be achieved by adding idle bits. This is not limited in this embodiment of the present disclosure.

It should be noted that this implementation manner not only can be applied to downlink resource allocation, but also can be applied to uplink resource allocation. This is not limited in this embodiment of the present disclosure.

Third Manner:

Further, in the second manner, the resource allocation information further includes a segment number of a segmented bandwidth, where the segmented bandwidth is a segment of a system bandwidth after the system bandwidth is segmented.

That is, in this embodiment of the present disclosure, the entire system bandwidth may be segmented first, and then an allocated resource is indicated using a RIV in each segment.

For example, using a bandwidth of 10 MB (50 RBs) as an example, the bandwidth of 10 MB is divided into two segments first. If the resource allocation unit is ½ RB, FRBs on each segment of bandwidth are numbered from 0 to 49. Further, on each segment of bandwidth, an allocated resource is indicated according to the foregoing RIV indication method, and details are not described herein again.

In this solution, the bandwidth is segmented, and $N_{FRB}$ is a total quantity of resources on the segmented bandwidth. Therefore, the resource allocation information further needs to include the number of the segmented bandwidth. For example, a bit 0 is used to indicate a first segment of bandwidth, and a bit 1 is used to indicate a second segment of bandwidth. This is not limited in this embodiment of the present disclosure.

After receiving the resource allocation information and the resource allocation unit indication information, the user equipment may determine, according to a value of the RIV and the segment number of the segmented bandwidth, a location of a resource allocated by the base station to the user equipment.

It should be noted that assuming that the foregoing resource allocation method is used for downlink resource allocation, if the system bandwidth is segmented and numbered first, during resource allocation, a total quantity $N_{FRB}^{DL}$ of FRBs on each segment of bandwidth is decreased. Because bits needed for resource allocation are $\lceil \log_2(N_{FRB}^{DL}(N_{FRB}^{DL}+1)/2) \rceil$, obviously, a quantity of bits needed for resource allocation is decreased. In this way, the quantity of bits needed for resource allocation can be saved.

It should be noted that, to be compatible with all bandwidths and all DCI formats, in this implementation manner, a size of a DCI RB allocation field in the existing resource allocation method may not be changed. For example, an objective of having a same size as an RB allocation field in previous DCI is achieved by adding idle bits. Alternatively, corresponding bits may be added on the basis of the size of the DCI RB allocation field in the existing resource allocation method. For example, if FRB=½RB, one bit/two bits may be added on the basis of the size of the DCI RB allocation field in the existing resource allocation method, if FRB=¼RB, two bits/three bits may be added on the basis of the size of the DCI RB allocation field in the existing resource allocation method. This is not limited in this embodiment of the present disclosure.

It should be noted that this solution not only can be applied to downlink resource allocation, but also can be applied to uplink resource allocation. This is not limited in this embodiment of the present disclosure.

Fourth Manner:

That the resource allocation information includes information indicating at least one FRB allocated to the user equipment includes that if $L_{CFRBs}=1+2N$, where a value of N depends on a quantity of RBs continuously allocated to the user equipment, the resource allocation information includes a RIV and indication information of the quantity of the RBs continuously allocated to the user equipment, where $RIV=FRB_{start}$, $L_{CRBs}=\lceil L_{CFRBs}/2 \rceil$, $FRB_{start}$ indicates a number of a starting FRB in the at least one FRB continuously allocated to the user equipment, $L_{CRBs}$ indicates the quantity of the RBs continuously allocated to the user equipment, and $N=L_{CRBs}-1$.

For example, the resource allocation unit is ½ RB, and the quantity of FRBs allocated to the user equipment is 3, that is, $N=L_{CRBs}-1=\lceil L_{CFRBs}/2 \rceil-1=1$. Assuming that $FRB_{start}=0$, in this case, the resource allocation information includes a RIV and indication information of a quantity of RBs continuously allocated to the user equipment, where $RIV=FRB_{start}=0$, and the quantity of the RBs continuously allocated to the user equipment is 2.

If the indication information of the quantity of the RBs continuously allocated to the user equipment is indicated using one bit, as shown in Table 6, resource allocation of 0.5 RB and 1.5 RBs can be supported. In this case, the quantity of the FRBs allocated to the user equipment is 3, that is, a resource of 1.5 RBs is allocated, and the quantity of the RBs continuously allocated to the user equipment is 2. Therefore, the indication information is 1.

TABLE 6

|  | 1-bit indication | |
| --- | --- | --- |
|  | 0 | 1 |
| Quantity of RBs | 1RB | 2RB |

If the indication information of the quantity of the RBs continuously allocated to the user equipment is indicated using two bits, as shown in Table 7, resource allocation of 0.5 RB, 1.5 RBs, 2.5 RBs, and 3.5 RBs can be supported. In this case, the quantity of the FRBs allocated to the user equipment is 3, that is, a resource of 1.5 RBs is allocated, and the quantity of the RBs continuously allocated to the user equipment is 2. Therefore, the indication information is 01.

TABLE 7

|  | 2-bit indication | | | |
| --- | --- | --- | --- | --- |
|  | 00 | 01 | 10 | 11 |
| Quantity of RBs | 1RB | 2RB | 3RB | 4RB |

By analogy, if the indication information of the quantity of the RBs continuously allocated to the user equipment is indicated using three bits, resource allocation of 0.5 RB, 1.5 RBs, 2.5 RBs, 3.5 RBs, 4.5 RBs, 5.5 RBs, 6.5 RBs, and 7.5 RBs can be supported. This is not limited in this embodiment of the present disclosure.

After receiving the resource allocation information and the resource allocation unit indication information, the user equipment may determine, according to the value of the RIV and the indication information "01" of the quantity of the RBs continuously allocated to the user equipment, that a location of a resource allocated by the base station to the user equipment is locations corresponding to FRBs numbered 0, 1, and 2.

It should be noted that in this implementation manner, FRBs in a bandwidth need to be numbered first. For example, using a bandwidth of 10 MB (50 RBs) as an example, if the resource allocation unit is ½ RB, the FRBs in the bandwidth need to be numbered from 0 to 99 first.

It should be noted that, to be compatible with all bandwidths and all DCI formats, if the user equipment is allocated 0.5 RB or 1.5 RBs, in this implementation manner, a size of a DCI RB allocation field in the existing resource allocation method may not be changed. For example, an objective of having a same size as an RB allocation field in previous DCI is achieved by adding idle bits. If the user equipment is allocated 0.5 RB, 1.5 RBs, 2.5 RBs, or 3.5 RBs, this implementation manner needs to add a corresponding bit on the basis of the size of the DCI RB allocation field in the existing resource allocation method, for example, one bit. This is not limited in this embodiment of the present disclosure.

It should be noted that this implementation manner not only can be applied to downlink resource allocation, but also can be applied to uplink resource allocation. This is not limited in this embodiment of the present disclosure.

Fifth Manner:

That the resource allocation information includes information indicating at least one FRB allocated to the user equipment includes that if $L_{CFRBs}=1$, the resource allocation information includes a RIV and a number of the at least one FRB allocated to the user equipment in corresponding continuous RBs, where $RIV=RB_{start}$, $L_{CRBs}$ indicates a quantity of the continuous RBs corresponding to the at least one FRB allocated to the user equipment, and $RB_{start}$ indicates a number of a starting RB in the continuous RBs corresponding to the at least one FRB allocated to the user equipment.

For example, if the resource allocation unit is ½ RB, when the EVS voice packet is less than or equal to ½ RB, one FRB is allocated to the user equipment. Assuming that $RB_{start}=3$, and the number of the at least one FRB allocated to the user equipment in the corresponding continuous RBs is 0, in this case, the resource allocation information includes a RIV and the number of the at least one FRB allocated to the user equipment in the corresponding continuous RBs, where $RIV=RB_{start}=3$.

After receiving the resource allocation information and the resource allocation unit indication information, the user equipment may determine, according to the value of the RIV and the number of the at least one FRB allocated to the user equipment in the corresponding continuous RBs, that a location of a resource allocated by the base station to the user equipment is a location of an FRB numbered 0 in an RB numbered 3.

It should be noted that in this implementation manner, RBs in a bandwidth need to be numbered first. For example, using a bandwidth of 10 MB (50 RBs) as an example, the RBs in the bandwidth need to be numbered from 0 to 49 first. Second, FRBs in each RB are numbered. For example, if the resource allocation unit is ½ RB, a bit 0 may be used to indicate a first FRB on the RB, and a bit 1 is used to indicate a second FRB on the RB. This is not limited in this embodiment of the present disclosure.

It should be noted that, to be compatible with all bandwidths and all DCI formats, in this implementation manner, a size of a DCI RB allocation field in the existing resource allocation method may not be changed. For example, an objective of having a same size as an RB allocation field in previous DCI may be achieved by adding idle bits. This is not limited in this embodiment of the present disclosure.

It should be noted that this implementation manner not only can be applied to downlink resource allocation, but also can be applied to uplink resource allocation. This is not limited in this embodiment of the present disclosure.

Sixth Manner:

That the resource allocation information includes information indicating at least one FRB allocated to the user equipment includes that if $L_{CFRBs}=M2$, the resource allocation information includes a RIV and a number of the at least one FRB allocated to the user equipment in corresponding continuous RBs, where $RIV=N_{RB}(L_{CRBs}-1)+RB_{start}$, $N_{RB}$ indicates a total quantity of RBs in a bandwidth, $L_{CRBs}$ indicates a quantity of the continuous RBs corresponding to the at least one FRB allocated to the user equipment, $RB_{start}$ indicates a number of a starting RB in the continuous RBs corresponding to the at least one FRB allocated to the user equipment, M2 is a positive integer greater than 1, and the at least one FRB allocated to the user equipment has a same number in the corresponding continuous RBs.

For example, the resource allocation unit is ½ RB, and the quantity of FRBs allocated to the user equipment is 3. Assuming that $N_{RB}=5$, $RB_{start}=0$, and the number of the at least one FRB allocated to the user equipment in the corresponding continuous RBs is 1, in this case, the resource allocation information includes a RIV and the number of the at least one FRB allocated to the user equipment in the corresponding continuous RBs, where $RIV=N_{RB}(L_{CRBs}-1)+RB_{start}=10$.

After receiving the resource allocation information and the resource allocation unit indication information, the user equipment may determine, according to the value of the RIV and the number 1 of the at least one FRB allocated to the user equipment in the corresponding continuous RBs, a location of a resource allocated by the base station to the user equipment. With reference to FIGS. 2A and 2B, it is easily obtained that the location of the resource allocated by the base station to a user is locations corresponding to FRBs numbered 1 in RBs numbered 0, 1, and 2.

It should be noted that in this implementation manner, RBs in a bandwidth need to be numbered first. For example, using a bandwidth of 10 MB (50 RBs) as an example, the RBs in the bandwidth need to be numbered from 0 to 49 first. Second, FRBs in each RB are numbered. For example, if the resource allocation unit is ½ RB, a bit 0 may be used to indicate a first FRB on the RB, and a bit 1 is used to indicate a second FRB on the RB. This is not limited in this embodiment of the present disclosure.

It should be noted that in this implementation manner, it is restricted that in the allocated RBs, the user equipment uses FRBs having same numbers.

It should be noted that in this implementation manner, the information about the continuous RBs corresponding to the at least one FRB allocated to the user equipment may be indicated using the RIV. In addition, the information about the continuous RBs corresponding to the at least one FRB allocated to the user equipment may be indicated using a conventional solution. For example, for downlink, the downlink type 0 or type 1 may be used. This is not limited in this embodiment of the present disclosure.

It should be noted that, to be compatible with all bandwidths and all DCI formats, in this implementation manner, a size of a DCI RB allocation field in the existing resource allocation method may not be changed. For example, an objective of having a same size as an RB allocation field in previous DCI is achieved by adding idle bits. Alternatively, a corresponding bit is added on the basis of the size of the DCI RB allocation field in the existing resource allocation method. For example, one bit may be added on the basis of the size of the DCI RB allocation field in the existing resource allocation method. This is not limited in this embodiment of the present disclosure.

It should be noted that the allocated FRBs in this implementation manner are discontinuous. Therefore, this implementation manner may be applied to downlink resource allocation only, and cannot be applied to uplink resource allocation.

Seventh Manner:

In the seventh manner, the resource allocation information further includes a segment number of a segmented bandwidth, where the segmented bandwidth is a segment of a system bandwidth after the system bandwidth is segmented.

That is, in this embodiment of the present disclosure, the entire system bandwidth may be segmented first, and then the allocated resource is indicated using a method of an RIV plus a number of the at least one FRB allocated to the user equipment in corresponding continuous RBs.

For example, using a bandwidth of 10 MB (50 RBs) as an example, the bandwidth of 10 M is divided into two segments first. If the resource allocation unit is ½ RB, FRBs on each segment of bandwidth are numbered from 0 to 49. Further, on each segment of bandwidth, the allocated resource is indicated according to the foregoing indication method of a RIV plus a number of the at least one FRB allocated to the user equipment in corresponding continuous RBs, and details are not described in this embodiment of the present disclosure.

Table 8 is a resource allocation indication list of the type 0 or the type 1 for different bandwidths. Table 9 is a resource allocation instruction list of the type 2 (that is, indication using a RIV) for different bandwidths. In Table 8 and Table 9, "segment" refers to a quantity of segments of the system bandwidth, "segment bit" refers to a quantity of bits indicating segment numbers of the system bandwidth, "quantity of RBs in a segment" refers to a quantity of RBs on a segmented bandwidth, "P" refers to a quantity of continuous RBs included in an RBG, "bit in a segment" refers to a quantity of bits indicating each RBG in a segment", and "fractional indication" refers to a quantity of bits indicating a number of the at least one FRB allocated to the user equipment in corresponding continuous RBs.

A bandwidth of 1.4 MHz in Table 8 is used as an example for description below.

Before being segmented, the bandwidth of 1.4 MHz includes 6 RBs. The quantity (P) of continuous RBs included in an RBG is 1, and six bits are used to indicate the resource allocation information.

After segmentation, if the bandwidth of 1.4 MHz is equally segmented into two segments, one bit is used to indicate segment numbers of the system bandwidth. For example, "0" may be used to indicate a first segment, and "1" may be used to indicate a second segment. The quantity of RBs in each segment is 3. The quantity (P) of continuous RBs included in an RBG is 1, and the quantity of bits indicating each RBG in the segment is 3. For example, "010" may be used to indicate that the second RB in the segment is occupied. Because the resource allocation unit is ½ RB, one bit is used to indicate the number of the at least on FRB allocated to the user equipment in the corresponding continuous RBs. For example, "0" may be used to indicate that the front half of the RB is occupied, and "1" may be used to indicate the rear half of the RB is occupied.

The resource allocation information may be indicated using six bits, where one bit is used to indicate the segment numbers of the system bandwidth, one bit is used to indicate the number of the at least one FRB allocated to the user equipment in the corresponding continuous RBs, and three bits are used to indicate each RBG in the segment. Therefore, one remaining bit may serve as a trailing bit.

TABLE 8

| Bandwidth | Quantity of RBs | P | Quantity of bits | Segment | Segment bit | Quantity of RBs in a segment | P | Bit in a segment | Fractional indication | Trailing bit |
|---|---|---|---|---|---|---|---|---|---|---|
| 1.4 | 6 | 1 | 6 | 2 | 1 | 3 | 1 | 3 | 1 | 1 |
| 3 | 15 | 2 | 8 | 4 | 2 | 4 | 1 | 4 | 1 | 1 |
| 5 | 25 | 2 | 13 | 2 | 1 | 13 | 2 | 7 | 1 | 4 |
| 10 | 50 | 3 | 17 | 2 | 1 | 25 | 2 | 13 | 1 | 2 |
| 15 | 75 | 4 | 19 | 2 | 1 | 38 | 3 | 13 | 1 | 4 |
| 20 | 100 | 4 | 25 | 2 | 1 | 50 | 3 | 17 | 1 | 6 |

TABLE 9

| Bandwidth | Quantity of RBs | Quantity of bits | Segment | Segment bit | Quantity of RBs in a segment | Bit in a segment | Fractional indication | Trailing bit |
|---|---|---|---|---|---|---|---|---|
| 1.4 | 6 | 5 | 2 | 1 | 3 | 3 | 1 | 0 |
| 3 | 15 | 7 | 4 | 2 | 4 | 4 | 1 | 0 |
| 5 | 25 | 9 | 2 | 1 | 13 | 7 | 1 | 0 |
| 10 | 50 | 11 | 2 | 1 | 25 | 9 | 1 | 0 |
| 15 | 75 | 12 | 2 | 1 | 38 | 10 | 1 | 0 |
| 20 | 100 | 13 | 2 | 1 | 50 | 11 | 1 | 0 |

In this solution, the bandwidth is segmented, and $N_{RB}$ is a total quantity of resources on the segmented bandwidth. Therefore, the resource allocation information further needs to include the number of the segmented bandwidth. For example, a bit 0 is used to indicate a first segment of bandwidth, and a bit 1 is used to indicate a second segment of bandwidth. This is not limited in this embodiment of the present disclosure.

After receiving the resource allocation information and the resource allocation unit indication information, the user equipment may determine, according to the value of the RIV, the number of the at least one FRB allocated to the user equipment in the corresponding continuous RBs, and the segment number of the segmented bandwidth, a location of a resource allocated by the base station to the user equipment.

It should be noted that assuming that the foregoing resource allocation method is used for downlink resource allocation, if the system bandwidth is segmented and numbered first, during resource allocation, a total quantity $N_{RB}^{DL}$ of RBs on each segment of bandwidth is decreased. Because bits needed for resource allocation are $\lceil \log_2(N_{RB}^{DL}(N_{RB}^{DL}+1)/2) \rceil$, obviously, a quantity of bits needed for resource allocation is decreased. In this way, the quantity of bits needed for resource allocation can be saved.

It should be noted that, to be compatible with all bandwidths and all DCI formats, in this implementation manner, a size of a DCI RB allocation field in the existing resource allocation method may not be changed. For example, an objective of having a same size as an RB allocation field in previous DCI may be achieved by adding idle bits. This is not limited in this embodiment of the present disclosure.

Eighth Manner:

That the resource allocation information includes information indicating at least one FRB allocated to the user equipment includes that if 1FRB=¼RB, $L_{CRBs}$=1, $L_{CFRBs}$=P1, where P1=1, 2, or 3, the resource allocation information includes a $RIV_1$ and a $RIV_2$, where $RIV_1$=$RB_{start}$, $RIV_2$=4($L_{CFRBs}$−1)+$FRB_{start}$, $L_{CFRBs}$ indicates a quantity of the at least one FRB continuously allocated to the user equipment, $L_{CRBs}$ indicates a quantity of continuous RBs corresponding to the at least one FRB allocated to the user equipment, $RB_{start}$ indicates a number of a starting RB in the continuous RBs corresponding to the at least one FRB allocated to the user equipment, and $FRB_{start}$ indicates a number of a starting FRB in the at least one FRB continuously allocated to the user equipment.

For example, the resource allocation unit is ¼ RB, and the quantity of RBs allocated to the user equipment is 2. Assuming that $RB_{start}$=0, $FRB_{start}$=1, and $L_{CFRBs}$=2, in this case, the resource allocation information includes $RIV_1$ and $RIV_2$, where $RIV_1$=$RB_{start}$=0, and $RIV_2$=4($L_{CFRBs}$−1)+$FRB_{start}$=5.

After receiving the resource allocation information and the resource allocation unit indication information, the user equipment may determine, according to values of $RIV_1$ and $RIV_2$, that a location of a resource allocated by the base station to the user equipment is locations corresponding to FRBs numbered 1 and 2 in an RB numbered 0.

It should be noted that in this implementation manner, RBs in a bandwidth need to be numbered first. For example, using a bandwidth of 10 MB (50 RBs) as an example, the RBs in the bandwidth need to be numbered from 0 to 49 first. Second, FRBs in each RB are numbered. For example, if the resource allocation unit is ¼ RB, FRBs in each RB may be numbered 0, 1, 2, and 3. This is not limited in this embodiment of the present disclosure.

It should be noted that, to be compatible with all bandwidths and all DCI formats, in this implementation manner, corresponding bits, such as two bits, need to be added on the basis of a size of a DCI RB allocation field in the existing resource allocation method. This is not limited in this embodiment of the present disclosure.

It should be noted that this implementation manner not only can be applied to downlink resource allocation, but also can be applied to uplink resource allocation. This is not limited in this embodiment of the present disclosure.

Ninth Manner:

That the resource allocation information includes information indicating at least one FRB allocated to the user equipment includes that if 1FRB=¼RB, and $L_{CFRBs}$=P2, where P2=1, 2, or 3, the resource allocation information includes a RIV and indication information of a quantity of the at least one FRB continuously allocated to the user equipment, where RIV=$FRB_{start}$, $L_{CFRBs}$ indicates the quantity of the at least one FRB continuously allocated to the user equipment, and $FRB_{start}$ indicates a number of a starting FRB in the at least one FRB continuously allocated to the user equipment.

For example, the resource allocation unit is ¼ RB, and the quantity P2 of FRBs allocated to the user equipment is 2. Assuming that $FRB_{start}$=2, this case, the resource in allocation information includes a RIV and indication information of a quantity of the at least one FRB continuously allocated to the user equipment, where RIV=$FRB_{start}$=2.

Assuming that the indication information of the quantity of the at least one FRB continuously allocated to the user equipment is indicated using two bits, details may be shown in Table 10.

TABLE 10

|  | 2-bit indication | | | |
| --- | --- | --- | --- | --- |
|  | 00 | 01 | 10 | 11 |
| Quantity of RBs | 1/4RB | 2/4RB | 3/4RB | Reserved |

After receiving the resource allocation information and the resource allocation unit indication information, the user equipment may determine, according to the RIV and the indication information of the quantity of the at least one FRB continuously allocated to the user equipment, a location of a resource allocated by the base station to the user equipment. Assuming that the indication information of the quantity of the at least one FRB continuously allocated to the user equipment is 01, it is determined that the location of the resource allocated by the base station to a user is locations corresponding to FRBs numbered 2 and 3.

It should be noted that in this implementation manner, FRBs in a bandwidth need to be numbered first. For example, using a bandwidth of 10 MB (50 RBs) as an example, the RBs in the bandwidth need to be numbered from 0 to 199 first. This is not limited in this embodiment of the present disclosure.

It should be noted that, to be compatible with all bandwidths and all DCI formats, in this implementation manner, corresponding bits, such as two bits, need to be added on the basis of a size of a DCI RB allocation field in the existing resource allocation method. This is not limited in this embodiment of the present disclosure.

It should be noted that this implementation manner not only can be applied to downlink resource allocation, but also can be applied to uplink resource allocation. This is not limited in this embodiment of the present disclosure.

It should be noted that the first manner to the ninth manner list some indication methods for resource allocation information as examples. Certainly, there may be other possible indication methods. This is not limited in this embodiment of the present disclosure.

It should be noted that in this embodiment of the present disclosure, after determining the resource allocation information and the resource allocation unit indication information, the base station may send, according to the resource allocation information and the resource allocation unit indication information, downlink data to the user equipment or receive uplink data sent by the user equipment. This is not limited in this embodiment of the present disclosure.

Because resource allocation information in this embodiment of the present disclosure includes information indicating at least one FRB allocated to user equipment, that is, during resource allocation, an FRB may be allocated to the user equipment, where a resource occupied by the FRB is less than one RB. In this way, when transmission of one EVS voice packet does not need one RB, only an FRB smaller than an RB may be allocated to the user equipment. This is unlike the prior art in which a minimum resource allocation granularity is always per RB, and when the transmission of one EVS voice packet does not need one RB, one RB is still allocated to the user equipment, resulting in a waste of user spectrum resources. Spectrum utilization in an EVS scenario is improved.

Embodiment 2

Figure 5:
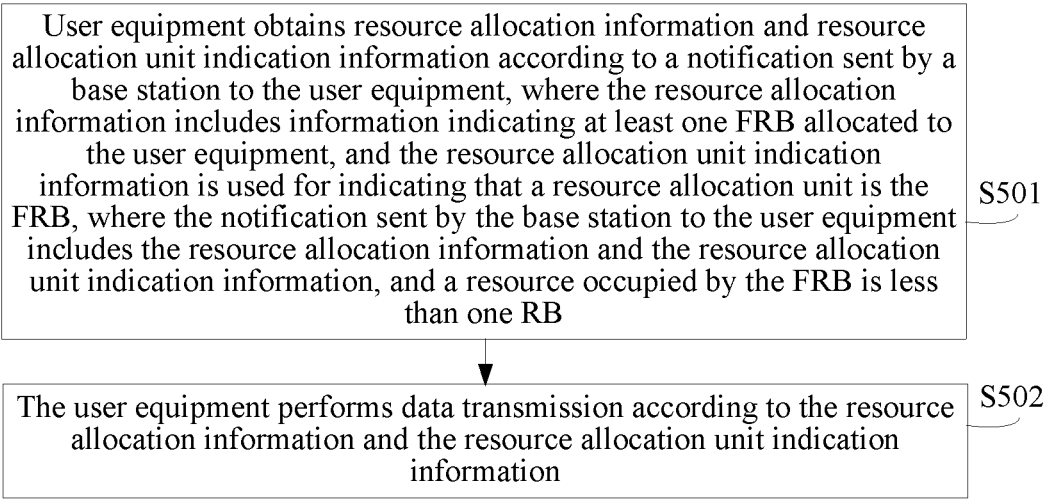
FIG. 5 is a schematic flowchart 3 of a resource allocation method according to an embodiment of the present disclosure.

This embodiment of the present disclosure provides a resource allocation method, which may be applied to user equipment in an LTE system shown in FIG. 1. As shown in FIG. 5, the method includes the following steps.

Step S501: User equipment obtains resource allocation information and resource allocation unit indication information according to a notification sent by a base station to the user equipment, where the resource allocation information includes information indicating at least one FRB allocated to the user equipment, and the resource allocation unit indication information is used for indicating that a resource allocation unit is the FRB, where the notification sent by the base station to the user equipment includes the resource allocation information and the resource allocation unit indication information, and a resource occupied by the FRB is less than one RB.

Further, in this embodiment of the present disclosure, a minimum resource allocation granularity is per FRB, and the resource allocation information obtained by the user equipment includes the information indicating the at least one FRB allocated to the user equipment.

It should be noted that in this embodiment of the present disclosure, the resource allocation unit FRB that is indicated by the resource allocation unit indication information determined by the base station is a type of FRB. The FRB may be ½ RB, ¼ RB, or of another size. The information about the at least one FRB allocated to the user equipment may be information about one FRB, information about two FRBs, or information about three FRBs. This is not limited in this embodiment of the present disclosure.

For example, assuming that the resource allocation unit is ½ RB, and the base station allocates a resource of three ½ RBs (that is, 1.5 RBs) to the user equipment, the resource allocation unit that is indicated by the resource allocation unit indication information obtained by the user equipment according to the notification sent by the base station to the user equipment is ½ RB, and the resource allocation information includes information indicating three FRBs allocated to the user equipment.

Step S502: The user equipment performs data transmission according to the resource allocation information and the resource allocation unit indication information.

Further, after obtaining the resource allocation information and the resource allocation unit indication information, the user equipment may receive, according to the resource allocation information and the resource allocation unit indication information, downlink data sent by the base station or send uplink data to the base station. This is not limited in this embodiment of the present disclosure.

Further, in one possible implementation manner, that user equipment obtains resource allocation information and resource allocation unit indication information according to a notification sent by a base station to the user equipment includes receiving, by the user equipment, DCI sent by the base station, where the DCI includes the resource allocation information and the resource allocation unit indication information.

Usually, the base station may add a corresponding bit to the DCI to indicate the resource allocation unit. For example, 1-bit information may be added to the DCI to indicate whether the resource allocation unit is an RB or an FRB. In this way, after receiving and successfully parsing the DCI, the user equipment may determine the resource allocation unit according to indication information of the bit in the DCI. For example, if the user equipment and the base station negotiate that at the first bit in the DCI, "0" indicates that the resource allocation unit is an RB and "1" indicates that the resource allocation unit is ½ RB, after obtaining the DCI, if the user equipment reads that the first bit is 1, the user equipment learns that the resource allocation unit is ½ RB.

In another possible implementation manner, that user equipment obtains resource allocation information and resource allocation unit indication information according to a notification sent by a base station to the user equipment includes receiving, by the user equipment, DCI sent by the base station, where the DCI includes the resource allocation information, and receiving, by the user equipment, RRC signaling sent by the base station, where the RRC signaling includes the resource allocation unit indication information.

For example, the base station may notify the user equipment of whether the resource allocation unit is an RB or an FRB using the RRC signaling. In this way, after receiving the RRC signaling, the user equipment may directly determine the resource allocation unit according to the RRC signaling. For example, if the resource allocation unit indication information in the RRC signaling indicates that the resource allocation unit is ¼ RB, after receiving the RRC signaling, the user equipment may learn that the resource allocation unit is ¼ RB.

It may be understood that in this embodiment of the present disclosure, the base station may notify the user equipment of the resource allocation information and the resource allocation unit indication information in another manner, for example, notifying the user equipment using another message or signaling. Therefore, that user equipment obtains resource allocation information and resource allocation unit indication information according to a notification sent by a base station to the user equipment is not limited to the foregoing two specific implementation manners.

Further, in this embodiment of the present disclosure, the resource allocation information may be indicated using multiple methods. Further, refer to the description of the first manner to the ninth manner in Embodiment 1, and details are not described in this embodiment of the present disclosure again.

Because resource allocation information in this embodiment of the present disclosure includes information indicating at least one FRB allocated to user equipment, that is, during resource allocation, an FRB may be allocated to the user equipment, where a resource occupied by the FRB is less than one RB. In this way, when transmission of one EVS voice packet does not need one RB, only an FRB smaller than an RB may be allocated to the user equipment. This is unlike the prior art in which a minimum resource allocation granularity is always per RB, and when the transmission of one EVS voice packet does not need one RB, one RB is still allocated to the user equipment, resulting in a waste of user spectrum resources. Spectrum utilization in an EVS scenario is improved.

Embodiment 3

Figure 6:
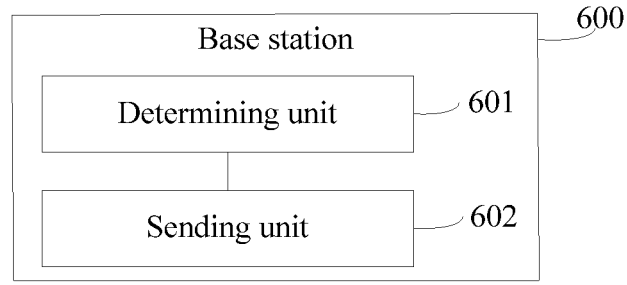
FIG. 6 is a schematic structural diagram 1 of a base station according to an embodiment of the present disclosure.

This embodiment of the present disclosure provides a base station 600. Further, as shown in FIG. 6, the base station 600 includes a determining unit 601 and a sending unit 602.

The determining unit 601 is configured to determine resource allocation information and resource allocation unit indication information, where the resource allocation information includes information indicating at least one FRB allocated to user equipment, and the resource allocation unit indication information is used for indicating that a resource allocation unit is the FRB, where a resource occupied by the FRB is less than one RB.

The sending unit 602 is configured to notify the user equipment of the resource allocation information and the resource allocation unit indication information.

The sending unit 602 is further configured to send DCI to the user equipment, where the DCI includes the resource allocation information and the resource allocation unit indication information.

Alternatively, the sending unit 602 is further configured to send DCI to the user equipment, where the DCI includes the resource allocation information, and send RRC signaling to the user equipment, where the RRC signaling includes the resource allocation unit indication information.

The determining unit 601 is further configured to determine, before determining the resource allocation information and the resource allocation unit indication information, whether the user equipment can support an FRB, and determine, if the user equipment can support the FRB, a size of an EVS voice packet and a channel condition, and determine that the resource allocation unit is the FRB according to the size of the EVS voice packet and the channel condition.

The determining unit 601 is further configured to determine the resource allocation information and the resource allocation unit indication information according to the resource allocation unit.

Further, in this embodiment of the present disclosure, the resource allocation information may be indicated using multiple methods. Further, refer to the description of the first manner to the ninth manner in Embodiment 1, and details are not described in this embodiment of the present disclosure again.

For a method of performing resource allocation using the base station 600 provided in this embodiment of the present disclosure, refer to the description of Embodiment 1, and details are not described in this embodiment of the present disclosure again.

Because resource allocation information in this embodiment of the present disclosure includes information indicating at least one FRB allocated to user equipment, that is, during resource allocation, an FRB may be allocated to the user equipment, where a resource occupied by the FRB is less than one RB. In this way, when transmission of one EVS voice packet does not need one RB, only an FRB smaller than an RB may be allocated to the user equipment. This is unlike other approaches in which a minimum resource allocation granularity is always per RB, and when the transmission of one EVS voice packet does not need one RB, one RB is still allocated to the user equipment, resulting in a waste of user spectrum resources. Spectrum utilization in an EVS scenario is improved.

Embodiment 4

Figure 7:
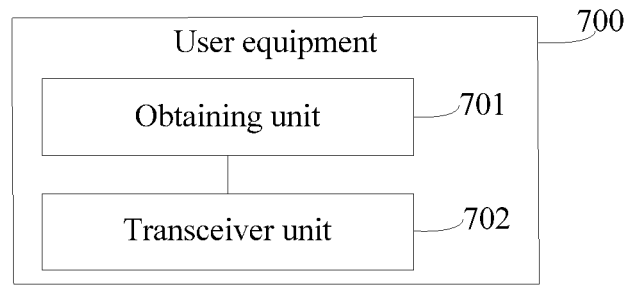
FIG. 7 is a schematic structural diagram 1 of user equipment according to an embodiment of the present disclosure.

This embodiment of the present disclosure provides user equipment 700. Further, as shown in FIG. 7, the user equipment 700 includes an obtaining unit 701 and a transceiver unit 702.

The obtaining unit 701 is configured to obtain resource allocation information and resource allocation unit indication information according to a notification sent by a base station to the user equipment 700, where the resource allocation information includes information indicating at least one FRB allocated to the user equipment 700, and the resource allocation unit indication information is used for indicating that a resource allocation unit is the FRB, where the notification sent by the base station to the user equipment 700 includes the resource allocation information and the resource allocation unit indication information, and a resource occupied by the FRB is less than one RB.

The transceiver unit 702 is configured to perform data transmission according to the resource allocation information and the resource allocation unit indication information.

The obtaining unit 701 is further configured to receive DCI sent by the base station, where the DCI includes the resource allocation information and the resource allocation unit indication information.

Alternatively, the obtaining unit 701 is further configured to receive DCI sent by the base station, where the DCI includes the resource allocation information, and receive RRC signaling sent by the base station, where the RRC signaling includes the resource allocation unit indication information.

Further, in this embodiment of the present disclosure, the resource allocation information may be indicated using multiple methods. Further, refer to the description of the first manner to the ninth manner in Embodiment 1, and details are not described in this embodiment of the present disclosure again.

Further, for method of performing resource allocation using the user equipment 700 provided in this embodiment of the present disclosure, refer to the description of Embodiment 2, and details are not described in this embodiment of the present disclosure again.

Because resource allocation information in this embodiment of the present disclosure includes information indicating at least one FRB allocated to the user equipment 700, that is, during resource allocation, an FRB may be allocated to the user equipment 700, where a resource occupied by the FRB is less than one RB. In this way, when transmission of one EVS voice packet does not need one RB, only an FRB smaller than an RB may be allocated to the user equipment 700. This is unlike other approaches in which a minimum resource allocation granularity is always per RB, and when the transmission of one EVS voice packet does not need one RB, one RB is still allocated to the user equipment, resulting in a waste of user spectrum resources. Spectrum utilization in an EVS scenario is improved.

Embodiment 5

Figure 8:
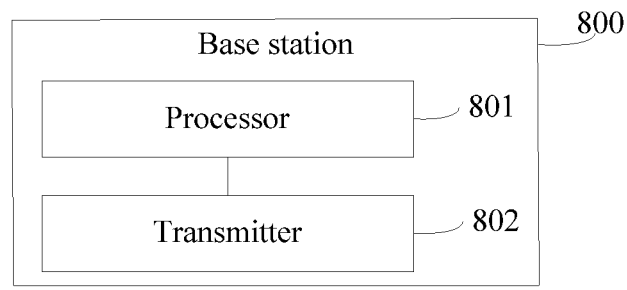
FIG. 8 is a schematic structural diagram 2 of a base station according to an embodiment of the present disclosure.

This embodiment of the present disclosure provides a base station 800. Further, as shown in FIG. 8, the base station 800 includes a processor 801 and a transmitter 802.

The processor 801 is configured to determine resource allocation information and resource allocation unit indication information, where the resource allocation information includes information indicating at least one FRB allocated to user equipment, and the resource allocation unit indication information is used for indicating that a resource allocation unit is the FRB, where a resource occupied by the FRB is less than one RB.

The transmitter 802 is configured to notify the user equipment of the resource allocation information and the resource allocation unit indication information.

The transmitter 802 is further configured to send DCI to the user equipment, where the DCI includes the resource allocation information and the resource allocation unit indication information.

Alternatively, the transmitter 802 is further configured to send DCI to the user equipment, where the DCI includes the resource allocation information, and send RRC signaling to the user equipment, where the RRC signaling includes the resource allocation unit indication information.

The processor 801 is further configured to determine, before determining the resource allocation information and the resource allocation unit indication information, whether the user equipment can support an FRB, and determine, if the user equipment can support the FRB, a size of an EVS voice packet and a channel condition, and determine that the resource allocation unit is the FRB according to the size of the EVS voice packet and the channel condition.

The processor 801 is further configured to determine the resource allocation information and the resource allocation unit indication information according to the resource allocation unit.

Further, in this embodiment of the present disclosure, the resource allocation information may be indicated using multiple methods. Further, refer to the description of the first manner to the ninth manner in Embodiment 1, and details are not described in this embodiment of the present disclosure again.

For a method of performing resource allocation using the base station 800 provided in this embodiment of the present disclosure, refer to the description of Embodiment 1, and details are not described in this embodiment of the present disclosure again.

Because resource allocation information in this embodiment of the present disclosure includes information indicating at least one FRB allocated to user equipment, that is, during resource allocation, an FRB may be allocated to the user equipment, where a resource occupied by the FRB is less than one RB. In this way, when transmission of one EVS voice packet does not need one RB, only an FRB smaller than an RB may be allocated to the user equipment. This is unlike other approaches in which a minimum resource allocation granularity is always per RB, and when the transmission of one EVS voice packet does not need one RB, one RB is still allocated to the user equipment, resulting in a waste of user spectrum resources. Spectrum utilization in an EVS scenario is improved.

Embodiment 6

Figure 9:
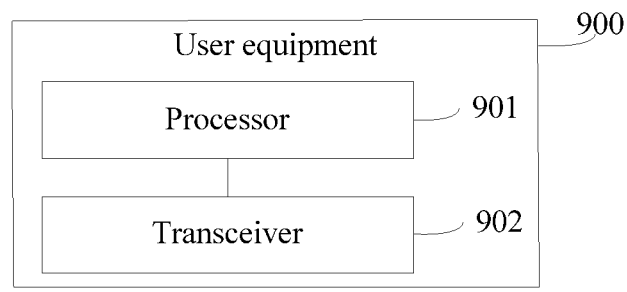
FIG. 9 is a schematic structural diagram 2 of user equipment according to an embodiment of the present disclosure.

This embodiment of the present disclosure provides user equipment 900. Further, as shown in FIG. 9, the user equipment 900 includes a processor 901 and a transceiver 902.

The processor 901 is configured to obtain resource allocation information and resource allocation unit indication information according to a notification sent by a base station to the user equipment 900, where the resource allocation information includes information indicating at least one FRB allocated to the user equipment, and the resource allocation unit indication information is used for indicating that a resource allocation unit is the FRB, where the notification sent by the base station to the user equipment 900 includes the resource allocation information and the resource allocation unit indication information, and a resource occupied by the FRB is less than one RB.

The transceiver 902 is configured to perform data transmission according to the resource allocation information and the resource allocation unit indication information.

The processor 901 is further configured to receive DCI sent by the base station, where the DCI includes the resource allocation information and the resource allocation unit indication information.

Alternatively, the processor 901 is further configured to receive DCI sent by the base station, where the DCI includes the resource allocation information, and receive RRC signaling sent by the base station, where the RRC signaling includes the resource allocation unit indication information.

Further, in this embodiment of the present disclosure, the resource allocation information may be indicated using multiple methods. Further, refer to the description of the first manner to the ninth manner in Embodiment 1, and details are not described in this embodiment of the present disclosure again.

Further, for a method of performing resource allocation using the user equipment 900 provided in this embodiment of the present disclosure, refer to the description of Embodiment 2, and details are not described in this embodiment of the present disclosure again.

Because resource allocation information in this embodiment of the present disclosure includes information indicating at least one FRB allocated to user equipment, that is, during resource allocation, an FRB may be allocated to the user equipment, where a resource occupied by the FRB is less than one RB. In this way, when transmission of one EVS voice packet does not need one RB, only an FRB smaller than an RB may be allocated to the user equipment. This is unlike the prior art in which a minimum resource allocation granularity is always per RB, and when the transmission of one EVS voice packet does not need one RB, one RB is still allocated to the user equipment, resulting in a waste of user spectrum resources. Spectrum utilization in an EVS scenario is improved.

It may be clearly understood by a person skilled in the art that, for the purpose of convenient and brief description, in the apparatus described above, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A resource allocation method, comprising:
determining resource allocation information and resource allocation block indication information, wherein the resource allocation information comprises information indicating at least one fractional resource block (FRB) allocated to user equipment, wherein the resource allocation block indication information indicates that a resource allocation block is the FRB, and wherein a resource occupied by the FRB is less than a bandwidth of one resource block (RB); and
notifying the user equipment of the resource allocation information and the resource allocation block indication information,
wherein when the resource allocation information comprises the information indicating the at least one FRB allocated to the user equipment, and when 1FRB=¼RB, $L_{CRBs}=1$, and $L_{CFRBs}=P1$, the resource allocation information further comprises a first resource indicator value ($RIV_1$) and a second resource indicator value ($RIV_2$), wherein the $RIV_1=RB_{start}$, wherein the $RIV_2=4(L_{CFRBs}-1)+FRB_{start}$, wherein the $L_{CFRBs}$ indicates a quantity of the at least one FRB continuously allocated to the user equipment, wherein the $L_{CRBs}$ indicates a quantity of continuous RBs corresponding to the at least one FRB allocated to the user equipment, wherein the $RB_{start}$ indicates a number of a starting RB in the continuous RBs corresponding to the at least one FRB allocated to the user equipment, wherein the $FRB_{start}$ indicates a number of a starting FRB in the at least one FRB continuously allocated to the user equipment, and wherein the P1=1, 2, or 3.

2. The method of claim 1, wherein notifying the user equipment of the resource allocation information and the resource allocation block indication information comprises sending downlink control information (DCI) to the user equipment, and wherein the DCI comprises the resource allocation information and the resource allocation block indication information.

3. The method of claim 1, wherein notifying the user equipment of the resource allocation information and the resource allocation block indication information comprises:
sending downlink control information (DCI) to the user equipment, wherein the DCI comprises the resource allocation information; and
sending radio resource control (RRC) signaling to the user equipment, wherein the RRC signaling comprises the resource allocation block indication information.

4. The method of claim 1, wherein before determining the resource allocation information and the resource allocation block indication information, the method further comprises:
determining whether the user equipment can support an FRB;
determining a size of an enhanced voice service (EVS) voice packet and a channel condition when the user equipment can support the FRB; and
determining that the resource allocation block is the FRB according to the size of the EVS voice packet and the channel condition, and
wherein determining the resource allocation information and the resource allocation block indication information comprises determining the resource allocation information and the resource allocation block indication information according to the resource allocation block.

5. The method of claim 1, wherein when the resource allocation information comprises the information indicating the at least one FRB allocated to the user equipment, the resource allocation information further comprises a resource indicator value (RIV) when $L_{CFRBs}=1$, wherein the $RIV=FRB_{start}$.

6. The method of claim 1, wherein when the resource allocation information comprises the information indicating the at least one FRB allocated to the user equipment, the resource allocation information further comprises a resource indicator value (RIV) when $L_{CFRBs}=M1$, wherein the $RIV=N_{FRB}(L_{CFRBs}-1)+FRB_{start}$, wherein the $N_{FRB}$ indicates a total quantity of FRBs in a bandwidth, and wherein the M is a positive integer greater than 1.

7. The method of claim 6, wherein when the $L_{CFRBs}=M1$, the resource allocation information further comprises a segment number of a segmented bandwidth including the FRB, and wherein the segmented bandwidth is a segment of a system bandwidth after the system bandwidth is segmented.

8. The method of claim 1, wherein when the resource allocation information comprises the information indicating the at least one FRB allocated to the user equipment, the resource allocation information further comprises a resource indicator value (RIV) and indication information of a quantity of the RBs continuously allocated to the user equipment when $L_{CFRBs}=1+2N$, wherein a value of N depends on the quantity of RBs continuously allocated to the user equipment, wherein the $RIV=FRB_{start}$, wherein an $L_{CRBs}=\lceil L_{CFRBs}/2 \rceil$, and wherein the $N=L_{CRBs}-1$.

9. The method of claim 1, wherein when the resource allocation information comprises the information indicating the at least one FRB allocated to the user equipment, the resource allocation information further comprises a resource indicator value (RIV) and a number of the at least one FRB allocated to the user equipment in corresponding continuous RBs when $L_{CFRBs}=1$, and wherein the $RIV=RB_{start}$, wherein an $L_{CRBs}=\lceil L_{CFRBs}/2 \rceil$.

10. The method of claim 1, wherein when the resource allocation information comprises the information indicating the at least one FRB allocated to the user equipment, the resource allocation information further comprises a resource indicator value (RIV) and a number of the at least one FRB allocated to the user equipment corresponding to continuous RBs when $L_{CFRBs}=M2$, wherein the $RIV=N_{RB}(L_{CRBs}-1)+RB_{start}$, wherein the $N_{RB}$ indicates a total quantity of RBs in a bandwidth, wherein the M2 is a positive integer greater than 1, and wherein the at least one FRB allocated to the user equipment has a same number in the corresponding continuous RBs.

11. The method of claim 10, wherein when the $L_{CFRBs}=M2$, the resource allocation information further comprises a segment number of a segmented bandwidth including the FRB, and wherein the segmented bandwidth is a segment of a system bandwidth after the system bandwidth is segmented.

12. A resource allocation method, comprising:
obtaining resource allocation information and resource allocation block indication information according to a notification from a base station, wherein the resource allocation information comprises information indicating at least one fractional resource block (FRB) allocated, wherein the resource allocation block indication information indicates that a resource allocation block is the FRB, wherein the notification from the base station comprises the resource allocation information and the resource allocation block indication information, and wherein a resource occupied by the FRB is less than a bandwidth of one resource block (RB); and
performing data transmission according to the resource allocation information and the resource allocation block indication information,
wherein when the resource allocation information comprises the information indicating the at least one FRB allocated to the user equipment, and when $1FRB=\frac{1}{4}RB$, $L_{CRBs}=1$, and $L_{CFRBs}=P1$, the resource allocation information further comprises a first resource indicator value ($RIV_1$) and a second resource indicator value ($RIV_2$), wherein the $RIV_1=RB_{start}$, wherein the $RIV_2=4(L_{CFRBs}-1)+FRB_{start}$, wherein the $L_{CFRBs}$ indicates a quantity of the at least one FRB continuously allocated to the user equipment, wherein the $L_{CRBs}$ indicates a quantity of continuous RBs corresponding to the at least one FRB allocated to the user equipment, wherein the $RB_{start}$ indicates a number of a starting RB in the continuous RBs corresponding to the at least one FRB allocated to the user equipment, wherein the $FRB_{start}$ indicates a number of a starting FRB in the at least one FRB continuously allocated to the user equipment, and wherein the P1=1, 2, or 3.

13. The method of claim 12, wherein obtaining the resource allocation information and the resource allocation block indication information comprises receiving downlink control information (DCI), and wherein the DCI comprises the resource allocation information and the resource allocation block indication information.

14. The method of claim 12, wherein obtaining the resource allocation information and the resource allocation block indication information comprises:
receiving, downlink control information (DCI) from the base station, wherein the DCI comprises the resource allocation information; and
receiving radio resource control (RRC) signaling from the base station, wherein the RRC signaling comprises the resource allocation block indication information.

15. An apparatus, comprising:
a transceiver configured to obtain resource allocation information and resource allocation block indication information according to a notification from a base station, wherein the resource allocation information comprises information indicating at least one fractional resource block (FRB) allocated, wherein the resource allocation block indication information indicates that a resource allocation block is the FRB, wherein the notification from the base station comprises the resource allocation information and the resource allocation block indication information, and wherein a resource occupied by the FRB is less than a bandwidth of one resource block (RB); and
a processor coupled to the transceiver and configured to perform data transmission according to the resource allocation information and the resource allocation block indication information,
wherein when the resource allocation information comprises the information indicating the at least one FRB allocated to the user equipment, and when $1FRB=\frac{1}{4}RB$, $L_{CRBs}=1$, and $L_{CFRBs}=P1$, the resource allocation information further comprises a first resource indicator value ($RIV_1$) and a second resource indicator value ($RIV_2$), wherein the $RIV_1=RB_{start}$, wherein the $RIV_2=4(L_{CFRBs}-1)+FRB_{start}$, wherein the $L_{CFRBs}$ indicates a quantity of the at least one FRB continuously allocated to the user equipment, wherein the $L_{CRBs}$ indicates a quantity of continuous RBs corresponding to the at least one FRB allocated to the user equipment, wherein the $RB_{start}$ indicates a number of a starting RB in the continuous RBs corresponding to the at least one FRB allocated to the user equipment, wherein the $FRB_{start}$ indicates a number of a starting FRB in the at least one FRB continuously allocated to the user equipment, and wherein the P1=1, 2, or 3.

16. The apparatus of claim 15, wherein the transceiver is further configured to receive downlink control information (DCI) from the base station, and wherein the DCI comprises the resource allocation information and the resource allocation block indication information.

17. The apparatus of claim 15, wherein the transceiver is further configured to:
receive downlink control information (DCI) from the base station, wherein the DCI comprises the resource allocation information; and
receive radio resource control (RRC) signaling from the base station, wherein the RRC signaling comprises the resource allocation block indication information.

* * * * *

UNITED STATES PATENT AND TRADEMARK OFFICE
CERTIFICATE OF CORRECTION

PATENT NO. : 10,575,308 B2
APPLICATION NO. : 15/656342
DATED : February 25, 2020
INVENTOR(S) : Dongdong Wei et al.

Page 1 of 1

It is certified that error appears in the above-identified patent and that said Letters Patent is hereby corrected as shown below:

In the Claims

Claim 6, Column 34, Line 56: "the M is a positive" should read "the M1 is a positive"

Signed and Sealed this
Fifth Day of May, 2020

Andrei Iancu
*Director of the United States Patent and Trademark Office*